United States Patent
Kimishima

(10) Patent No.: US 8,260,542 B2
(45) Date of Patent: Sep. 4, 2012

(54) NAVIGATION APPARATUS, OPERATION CONTROL METHOD, AND MOBILE TERMINAL APPARATUS

(75) Inventor: Masato Kimishima, Tokyo (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 12/853,346

(22) Filed: Aug. 10, 2010

(65) Prior Publication Data

US 2011/0066363 A1    Mar. 17, 2011

(30) Foreign Application Priority Data

Sep. 17, 2009  (JP) ................................. 2009-216082

(51) Int. Cl.
*G01C 21/00* (2006.01)
(52) U.S. Cl. ......... 701/400; 701/491; 701/526; 701/541
(58) Field of Classification Search .................. 701/400, 701/408, 449, 472, 491, 525, 526, 541
See application file for complete search history.

(56) References Cited

U.S. PATENT DOCUMENTS

| | | | | |
|---|---|---|---|---|
| 6,807,484 | B2 * | 10/2004 | Inoue et al. | 701/454 |
| 6,816,783 | B2 * | 11/2004 | Hashima et al. | 701/526 |
| 2004/0204840 | A1 * | 10/2004 | Hashima et al. | 701/209 |

FOREIGN PATENT DOCUMENTS

JP    2008-076374    4/2008

OTHER PUBLICATIONS

U.S. Appl. No. 12/852,695, filed Aug. 9, 2010, Kimishima.

* cited by examiner

*Primary Examiner* — David H Bollinger
(74) *Attorney, Agent, or Firm* — Oblon, Spivak, McClelland, Maier & Neustadt, L.L.P.

(57) ABSTRACT

A navigation apparatus including a geomagnetic sensor that detects a geomagnetic field of the navigation apparatus, an orientation calculation unit that calculates an orientation of the navigation apparatus based on the detected geomagnetic field, a cradle detection unit that detects that the navigation apparatus is connected to a cradle, and outputs a signal indicating that the navigation apparatus is connected to the cradle, and an operation control unit that receives the signal output from the cradle detection unit, and controls the orientation calculation unit to not detect the orientation of the navigation apparatus based on the detected geomagnetic field.

20 Claims, 15 Drawing Sheets

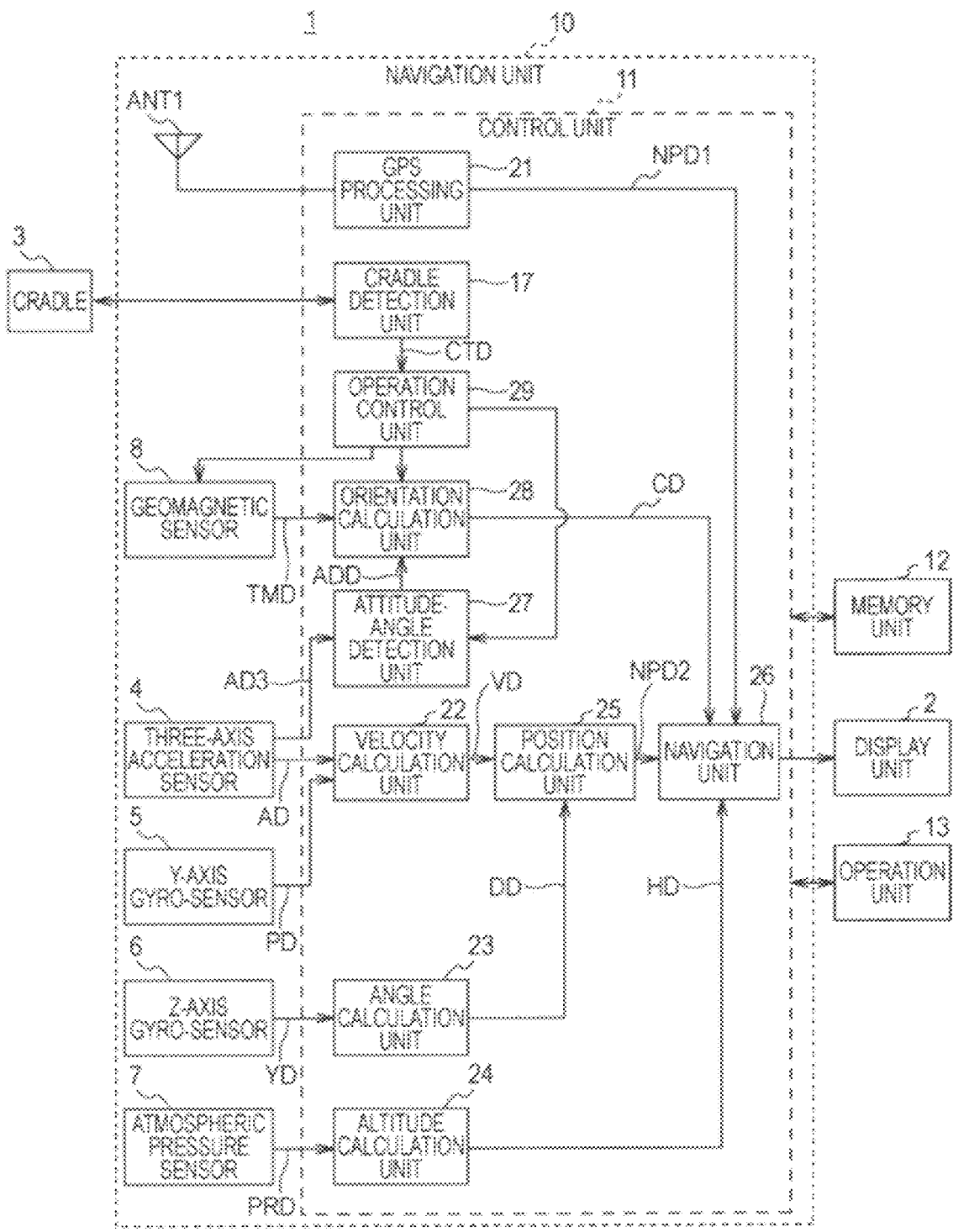

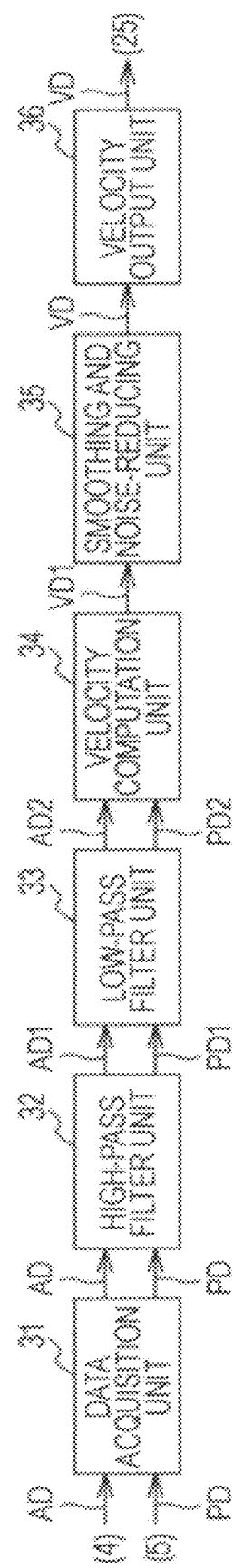

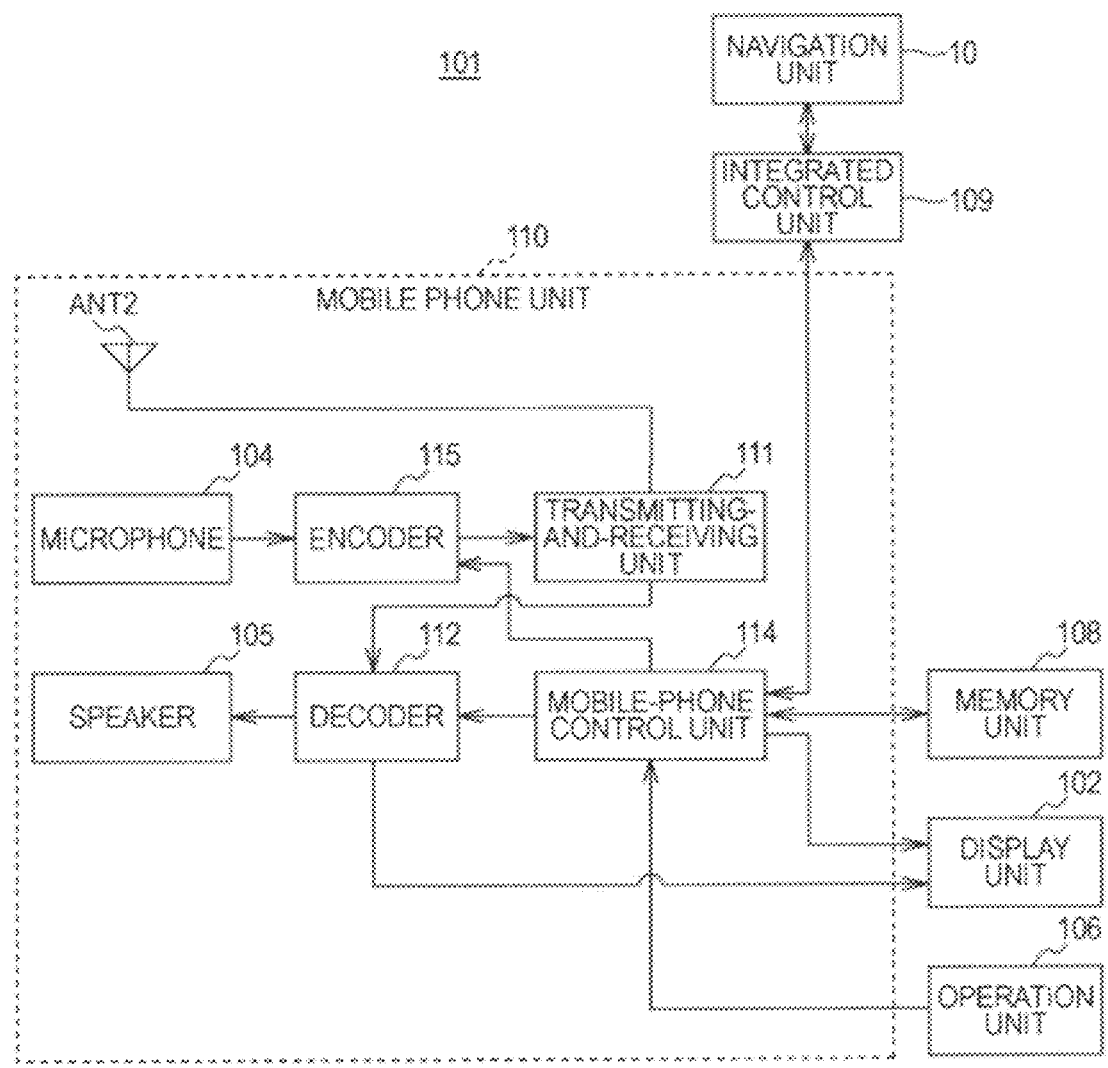

NAVIGATION APPARATUS, OPERATION CONTROL METHOD, AND MOBILE TERMINAL APPARATUS

CROSS REFERENCE TO RELATED APPLICATIONS

This application claims the benefit of priority under 35 U.S.C. §119 from Japanese Priority Patent Application JP 2009-216082 filed Sep. 17, 2009, the entire contents of each of which is incorporated herein by reference.

BACKGROUND OF THE INVENTION

1. Field of the Invention

The present invention relates to navigation apparatuses, operation control methods, and mobile terminal apparatuses, and is suitable for application to, for example, a navigation apparatus, an operation control method, and a mobile terminal apparatus in which an orientation is detected with, for example, a geomagnetic sensor and a map is displayed while the apparatus is attached to or detached from a vehicle.

2. Description of the Related Art

Navigation apparatuses mounted in, for example, moving vehicles have come into widespread use. Such a navigation apparatus calculates a current position on the basis of positioning information (for example, global positioning system (GPS) signals) received from positioning means, such as GPS satellites, and displays the position and moving direction of the vehicle on a map screen.

Some navigation apparatuses are portable and can be detached from the vehicle and easily carried by a user.

A portable navigation apparatus (hereinafter called a personal navigation device (PND)) which includes a geomagnetic sensor and calculates the orientation by detecting geomagnetism has been proposed (see, for example, Japanese Unexamined Patent Application Publication No. 2008-076374).

In addition to the PND, mobile terminal apparatuses having a navigation function have recently been proposed. Such a mobile terminal apparatus also includes a geomagnetic sensor and calculates the orientation by detecting geomagnetism.

SUMMARY OF THE INVENTION

According to the characteristics of the geomagnetic sensor, when the geomagnetic sensor is surrounded by, for example, a large metal body, such as a body of a vehicle, it is difficult to detect geomagnetic values representing the accurate orientation, owing to the magnetic influence of a stray magnetic field and isolation of the geomagnetism.

In this case, the geomagnetic sensor continuously operates even though it is difficult to detect the geomagnetic values representing the accurate orientation. Accordingly, there is a problem that the electric power for operating the geomagnetic sensor is wasted.

In light of the above-described situation, it is desirable to provide a navigation apparatus, an operation control method, and a mobile terminal apparatus with which electric power consumption can be reduced.

According to an exemplary embodiment, the specification discloses a navigation apparatus. The navigation apparatus includes a geomagnetic sensor configured to detect a geomagnetic field of the navigation apparatus; an orientation calculation unit configured to calculate an orientation of the navigation apparatus based on the detected geomagnetic field; a cradle detection unit configured to detect that the navigation apparatus is connected to a cradle, and to output a signal indicating that the navigation apparatus is connected to the cradle; and an operation control unit configured to receive the signal output from the cradle detection unit, and to control the orientation calculation unit to not detect the orientation of the navigation apparatus based on the detected geomagnetic field.

The operation control unit may be configured to control the orientation calculation unit to not detect an orientation of the navigation apparatus by deactivating the geomagnetic sensor.

The operation control unit may be configured to control the orientation calculation unit to not detect an orientation of the navigation apparatus by deactivating the orientation calculating unit.

The operation control unit may be configured to control the orientation calculation unit to not detect an orientation of the navigation apparatus by controlling the orientation calculation unit to ignore a signal received from the geomagnetic sensor.

The navigation apparatus may further include an attitude angle detection unit configured to detect an attitude angle indicating an inclination of the navigation apparatus with respect to a ground plane.

The orientation calculation unit may be configured to calculate an orientation of the navigation apparatus based on the detected attitude angle and the detected geomagnetic field.

The operation control unit may be configured to control the orientation calculation unit to not detect an orientation of the navigation apparatus by deactivating the attitude angle detection unit.

The operation control unit may be configured to control the orientation calculation unit to not detect an orientation of the navigation apparatus by deactivating the orientation calculating unit.

The operation control unit may be configured to control the orientation calculation unit to not detect an orientation of the navigation apparatus by controlling the orientation calculation unit to ignore a signal received from the attitude angle detection unit.

The navigation apparatus may also be a mobile telephone apparatus.

According to another exemplary embodiment, the specification discloses a non-transitory computer-readable medium including computer program instructions, which when executed by a navigation apparatus, cause the navigation apparatus to perform a method. The method includes detecting, at a geomagnetic sensor of the navigation apparatus, a geomagnetic field of the navigation apparatus; calculating, at an orientation calculation unit of the navigation apparatus, an orientation of the navigation apparatus based on the detected geomagnetic field; detecting, at a cradle detection unit of the navigation apparatus, that the navigation apparatus is connected to a cradle, and outputting a signal indicating that the navigation apparatus is connected to the cradle; and receiving, at an operation control unit of the navigation apparatus, the signal output from the cradle detection unit, and controlling the orientation calculation unit to not detect the orientation of the navigation apparatus based on the detected geomagnetic field.

Controlling the orientation calculation unit to not detect the orientation of the navigation apparatus may include deactivating the geomagnetic sensor.

Controlling the orientation calculation unit to not detect the orientation of the navigation apparatus may include deactivating the orientation calculating unit.

Controlling the orientation calculation unit to not detect the orientation of the navigation apparatus may include controlling the orientation calculation unit to ignore a signal received from the geomagnetic sensor.

The navigation apparatus according to this embodiment may be a mobile telephone apparatus.

According to another exemplary embodiment, the specification discloses a method. The method comprises detecting, at a geomagnetic sensor of the navigation apparatus, a geomagnetic field of the navigation apparatus; calculating, at an orientation calculation unit of the navigation apparatus, an orientation of the navigation apparatus based on the detected geomagnetic field; detecting, at a cradle detection unit of the navigation apparatus, that the navigation apparatus is connected to a cradle, and outputting a signal indicating that the navigation apparatus is connected to the cradle; and receiving, at an operation control unit of the navigation apparatus, the signal output from the cradle detection unit, and controlling the orientation calculation unit to not detect the orientation of the navigation apparatus based on the detected geomagnetic field.

Controlling the orientation calculation unit to not detect the orientation of the navigation apparatus may include deactivating the geomagnetic sensor.

Controlling the orientation calculation unit to not detect the orientation of the navigation apparatus may include deactivating the orientation calculating unit.

Controlling the orientation calculation unit to not detect the orientation of the navigation apparatus may include controlling the orientation calculation unit to ignore a signal received from the geomagnetic sensor.

The navigation apparatus according to this embodiment may be a mobile telephone apparatus.

BRIEF DESCRIPTION OF THE DRAWINGS

FIG. 7 is a schematic diagram illustrating the circuit structure of the PND;

FIG. 9 is a schematic diagram illustrating the structure of a velocity calculation unit;

FIG. 16 is a schematic diagram illustrating the circuit structure of the mobile phone apparatus.

DESCRIPTION OF THE PREFERRED EMBODIMENTS

Figure 1:
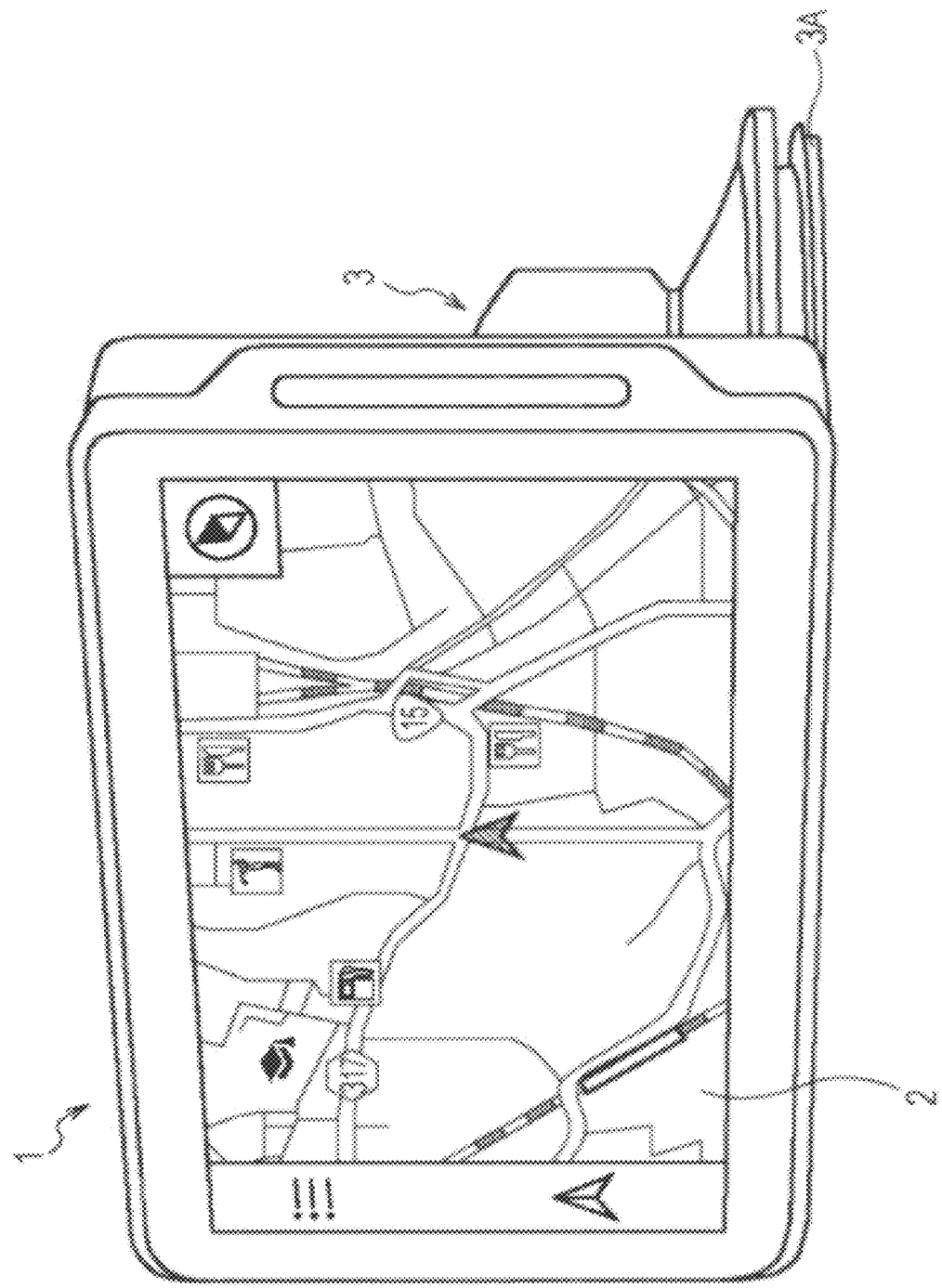
FIG. 1 is a schematic diagram illustrating the overall structure of a PND.

Embodiments of the present invention will be explained in the following order:

1. First Embodiment (Example of PND)
2. Second Embodiment (Example of Mobile Terminal Apparatus)
3. Other Embodiments 1. First Embodiment
1-1. Structure of PND
1-1-1. External Structure of PND As illustrated in FIG. 1, a PND 1 according to a first embodiment of the present invention includes a display unit 2 at a front side of the PND 1. A map image or the like corresponding to map data stored in, for example, a nonvolatile memory (not shown) installed in the PND 1 can be displayed on the display unit 2.

The PND 1 is structured such that the PND 1 is portable and can be easily carried by a user, and is assumed to be used in the house of the user, a vehicle cabin, or outside the vehicle cabin.

A cradle 3 is attached to a dashboard of a vehicle 9, which will be described below, with a cupule 3A, and is electrically connected to a battery in the vehicle 9.

The PND 1 can be attached to or detached from the cradle 3, which serves as a base unit. In the attached state, the PND 1 is held by the cradle 3 and is mechanically and electrically connected to the cradle 3.

Thus, the PND 1 can be operated by the electric power supplied from the battery in the vehicle 9 through the cradle 3. The PND 1 can also be operated independently by the electric power supplied from a built-in battery when the PND 1 is detached from the cradle 3.

Figure 2:
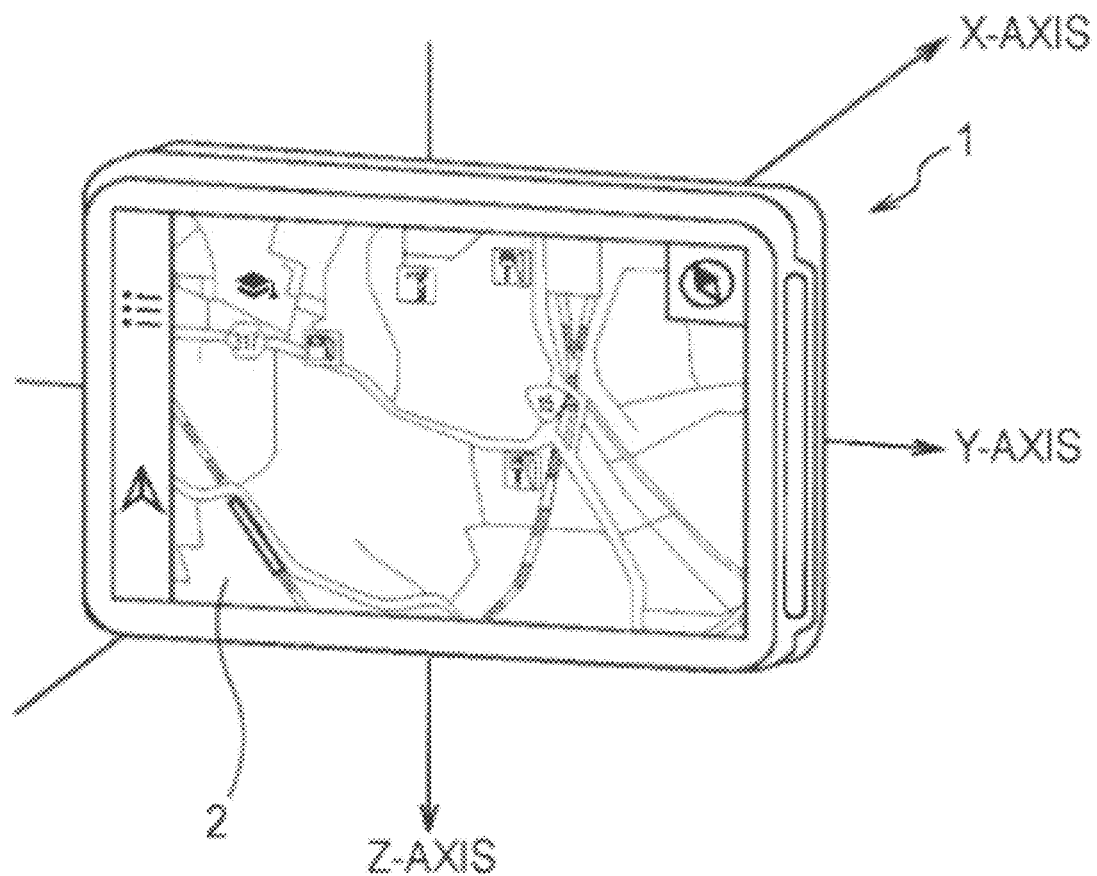
FIG. 2 is a schematic diagram illustrating the definition of the coordinate system of the PND.

The PND 1 is disposed such that the display unit 2 is substantially perpendicular to the moving direction of the vehicle 9. In this state, as illustrated in FIG. 2, the coordinate system of the PND 1 is defined such that the X-axis extends along the front-rear direction (moving direction) of the vehicle 9, the Y-axis extends horizontally along a direction perpendicular to the X-axis, and the Z-axis extends vertically.

In this coordinate system, the moving direction of the vehicle 9 is defined as the positive direction of the X-axis, the rightward direction is defined as the positive direction of the Y-axis, and the downward direction is defined as the positive direction of the Z-axis.

1-1-2. Sensor Structure of PND

Figure 3:
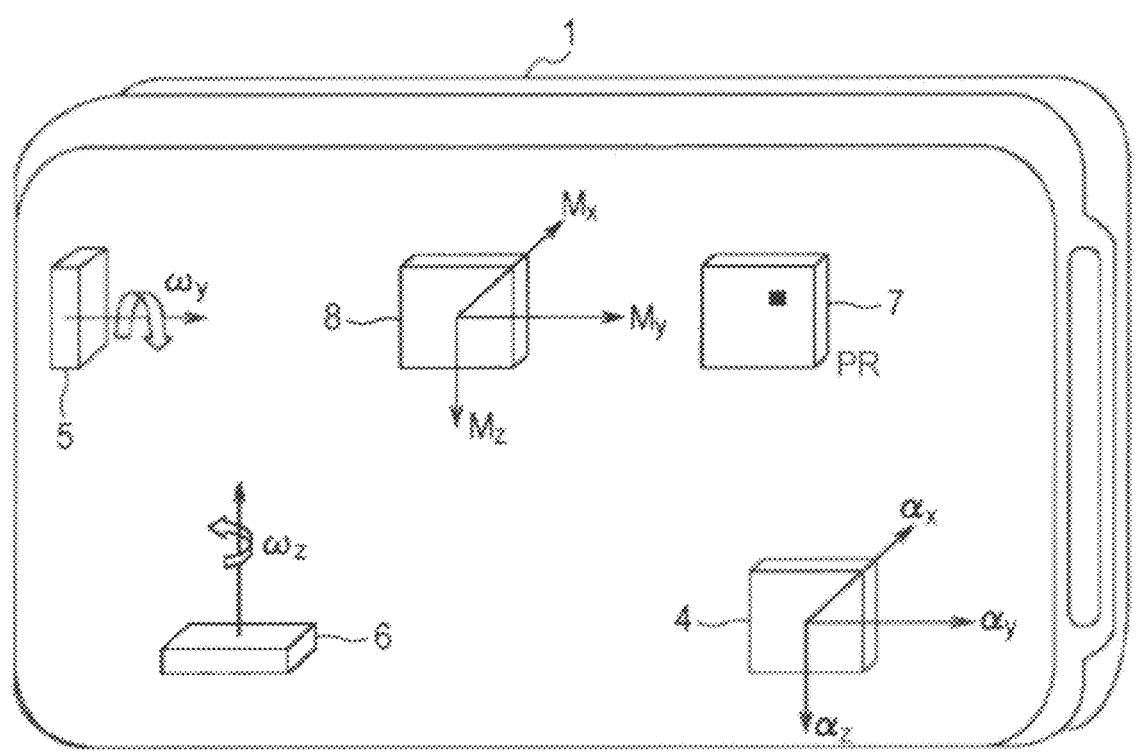
FIG. 3 is a schematic diagram illustrating the sensor structure of the PND.

As illustrated in FIG. 3, the PND 1 includes a three-axis acceleration sensor 4, a Y-axis gyro sensor 5, a Z-axis gyro sensor 6, an atmospheric pressure sensor 7, and a geomagnetic sensor 8.

The three-axis acceleration sensor 4 detects an acceleration $\alpha_x$ along the X-axis, an acceleration $\alpha_y$ along the Y-axis, and an acceleration $\alpha_z$ along the Z-axis as voltage values.

The Y-axis gyro sensor 5, the Z-axis gyro sensor 6, and the atmospheric pressure sensor 7 respectively detect an angular velocity $\omega_y$ around the Y-axis (hereinafter also called a pitch rate), an angular velocity $\omega_z$ around the Z-axis (hereinafter also called a yaw rate), and an ambient atmospheric pressure PR as voltage values.

The geomagnetic sensor 8 detects geomagnetism and obtains geomagnetic values $M_x$, $M_y$, and $M_z$ in the X-axis, the Y-axis, and the Z-axis, respectively, as voltage values.

1-2. Calculation Principle

The PND 1 according to the embodiment of the present invention can execute an autonomous positioning process. In this process, the velocity of the vehicle 9 is calculated on the basis of the accelerations, the pitch rate, etc., detected by the three-axis acceleration sensor 4, the Y-axis gyro sensor 5, etc., and then the current position is calculated. The basic principle for calculating the velocity and the current position will now be described.

1-2-1. Velocity Calculation Principle

Figure 4A:
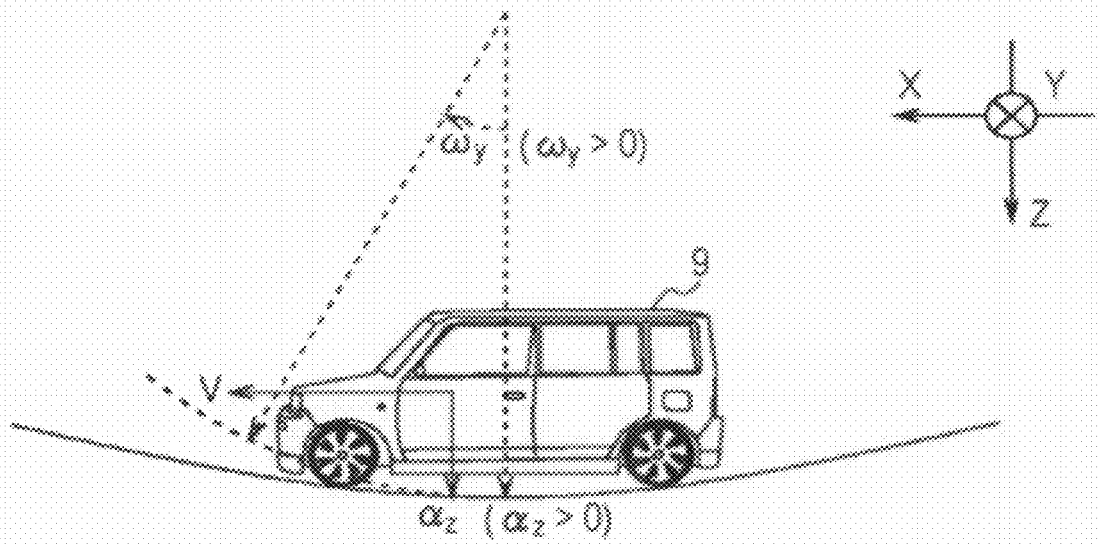
FIGS. 4A and 4B are schematic diagrams illustrating the manners in which a vehicle drives on a concave road and a convex road, respectively.
Figure 4B:
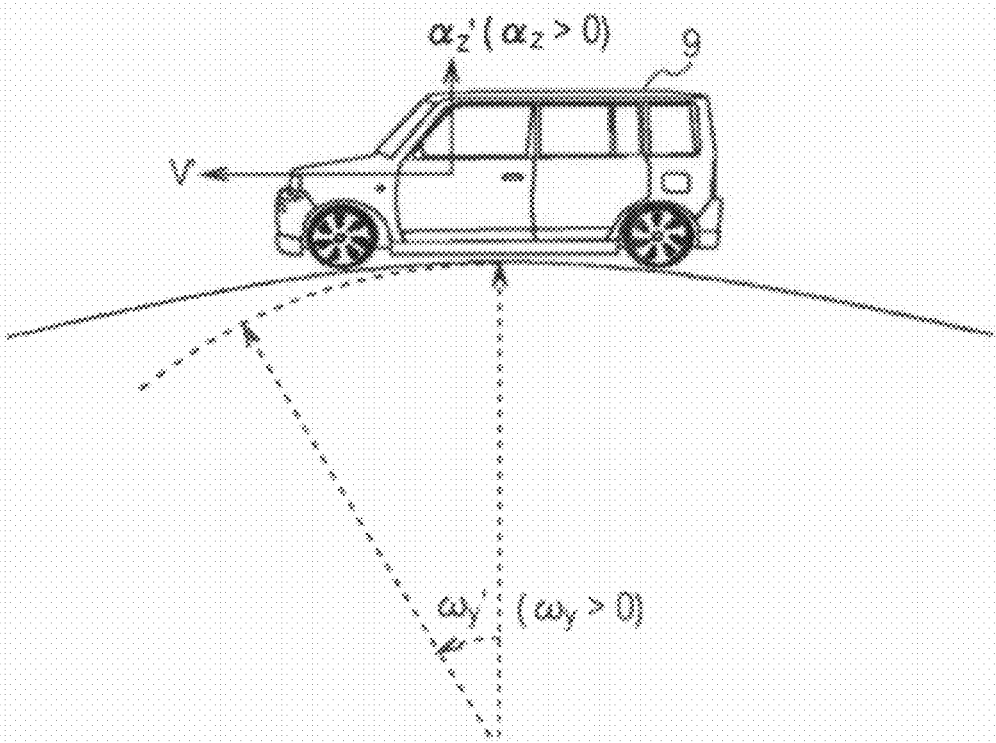

In the following description, first, the basic principle for calculating the velocity of the vehicle 9 will be explained. In actuality, roads on which the vehicle 9 drives are rarely flat, and the vehicle 9 usually drives on a road having a concave shape as a whole as illustrated in FIG. 4A, or on a road having a convex shape as a whole as illustrated in FIG. 4B.

The coordinate system of the vehicle 9 is defined such that the X-axis extends along the front-rear direction of the vehicle 9, the Y-axis extends horizontally along a direction perpendicular to the X-axis, and the Z-axis extends vertically.

When, for example, the PND 1 (not shown) is mounted on the dashboard of the vehicle 9 and the vehicle 9 drives on the concave road (FIG. 4A), the PND 1 operates the three-axis acceleration sensor 4 (FIG. 3) provided therein so as to detect the downward acceleration $\alpha_z$ along the Z-axis at a sampling frequency of, for example, 50 Hz.

The PND 1 also operates the Y-axis gyro sensor 5 (FIG. 3) provided therein so as to detect the angular velocity $\omega_y$ around the Y-axis (pitch rate) that is perpendicular to the moving direction at a sampling frequency of 50 Hz.

In the PND 1, the downward acceleration cc, along the Z-axis is defined as a positive acceleration. In addition, a pitch rate $\omega_y$ at the time when the vehicle swings upward with respect to the moving direction thereof along an imaginary circle formed along the concave road as shown in FIG. 4A is defined as a positive pitch rate.

The PND 1 calculates the velocity V in the moving direction 50 times per second on the basis of the acceleration $\alpha_z$ detected by the three-axis acceleration sensor 4 and the pitch rate $\omega_y$ detected by the Y-axis gyro sensor 5 by the following Equation (1).

$$V = \frac{\alpha_z}{\omega_y} \quad (1)$$

When the vehicle 9 drives on the convex road (FIG. 4B), the PND 1 operates the three-axis acceleration sensor 4 so as to detect the upward acceleration $\alpha_z'$ along the Z-axis at a sampling frequency of, for example, 50 Hz. The PND 1 also operates the Y-axis gyro sensor 5 provided therein so as to detect the pitch rate $\omega_y'$ around the Y-axis at a sampling frequency of, for example, 50 Hz.

The PND 1 calculates the velocity V' in the moving direction 50 times per second on the basis of the acceleration $\alpha_z'$ detected by the three-axis acceleration sensor 4 and the pitch rate $\omega_y'$ detected by the Y-axis gyro sensor 5 by the following Equation (2).

$$V' = \frac{\alpha_z'}{\omega_y'} \quad (2)$$

In the above description, the negative acceleration $\alpha_z$ is expressed as the acceleration $\alpha_z'$ for convenience of explanation. However, in practice, the three-axis acceleration sensor 4 detects the acceleration $\alpha_z'$ as a negative value for the acceleration $\alpha_z$. This also applies to the pitch rate $\omega_y'$. Although the negative pitch rate $\omega_y$ is expressed as the pitch rate $\omega_y'$, the Y-axis gyro sensor 5 detects the pitch rate $\omega_y'$ as a negative value for the pitch rate $\omega_y$. Therefore, in practice, the velocity V' is calculated as the velocity V.

1-2-2. Current Position Calculation Principle

Next, the current position calculation principle for calculating the current position on the basis of the velocity V calculated by the above-described velocity calculation principle and the angular velocity $\omega_z$ around the Z-axis will be explained.

Figure 5:
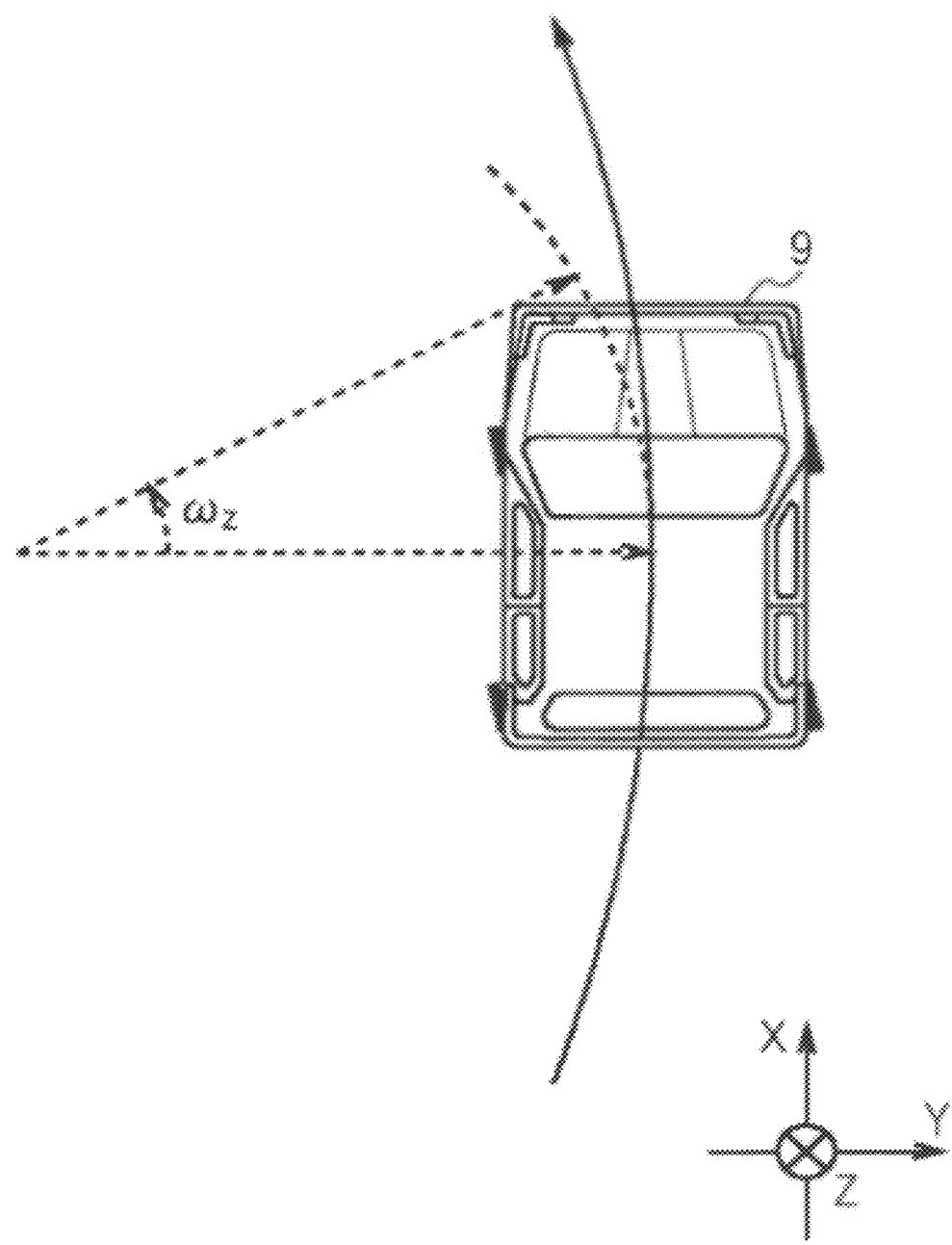
FIG. 5 is a schematic diagram illustrating the manner in which the vehicle rounds a curve.

As illustrated in FIG. 5, the PND 1 (not shown) operates the Z-axis gyro sensor 6 (FIG. 3) provided in the PND 1 so as to detect the angular velocity $\omega_z$ around the Z-axis (yaw rate) at a sampling frequency of, for example, 50 Hz while the vehicle 9 is, for example, turning left.

Figure 6:
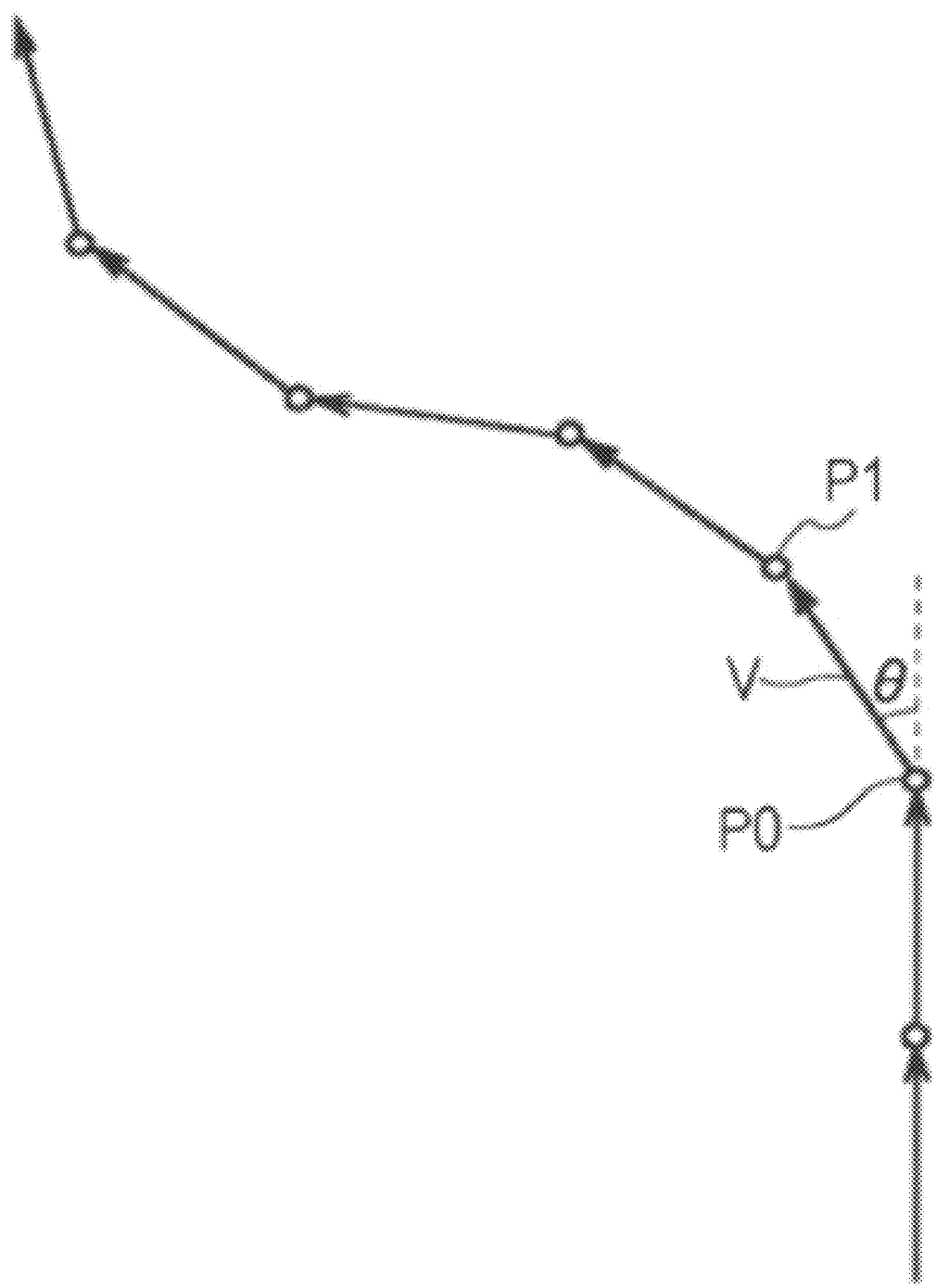
FIG. 6 is a schematic diagram illustrating a current-position calculating method using a velocity and an angle.

Next, as illustrated in FIG. 6, the PND 1 determines a change between the previous position P0 and the current position P1 on the basis of the velocity V at the previous position P0 and an angle θ. The angle θ is determined by multiplying the yaw rate a), detected by the Z-axis gyro sensor 6 by a sampling period (0.02 s in this case). Then, the PND 1 calculates the current position P1 by adding the change to the previous position P0.

1-3. Circuit Structure of PND

The circuit structure of the PND 1 will now be explained. As illustrated in FIG. 7, the PND 1 mainly includes a navigation unit 10 that includes a control unit 11 and various sensors and that provides a navigation function.

The control unit 11 is composed of a central processing unit (CPU), and the overall operation of the control unit 11 is controlled by a basic program read from a memory unit 12, such as a nonvolatile memory.

In addition, in the PND 1, the control unit 11 carries out an operation control process, which will be described below, in accordance with various application programs read from the memory unit 12.

An operation unit 13 composed of a touch panel with which the user can perform a touch operation is provided on a surface of the display unit 2. The control unit 11 displays a route guiding screen that shows a route to a desired destination specified by the user through the operation unit 13. Thus, the current position, a map of the surrounding area, and the suggested route are presented to the user.

In addition, the PND 1 switches between an in-vehicle mode in which a navigation process is performed while the PND 1 is attached to the vehicle 9 and an on-foot mode in which the navigation process is performed while the PND 1 is detached from the vehicle 9 and carried mainly by the user who moves on foot (this will be described in more detail below).

The control unit 11 also functions as a cradle detection unit 17. The cradle detection unit 17 periodically (for example, every three seconds) detects whether or not the PND 1 is electrically connected to the cradle 3, and generates a cradle detection signal CTD that represents the result of the detection. The cradle detection signal CTD is supplied to an operation control unit 29.

If the cradle detection unit 17 detects that the PND 1 is attached to the cradle 3, the control unit 11 operates the PND 1 in the in-vehicle mode.

1-4. In-Vehicle Mode

In the in-vehicle mode, the control unit 11 functions as a GPS processing unit 21, a velocity calculation unit 22, an angle calculation unit 23, an altitude calculation unit 24, a position calculation unit 25, and a navigation unit 26.

When the PND 1 operates in the in-vehicle mode, the PND 1 performs a GPS positioning process for determining the current position on basis of GPS signals if the GPS signals can be received. Alternatively, the PND 1 performs the autonomous positioning process for estimating the current position on the basis of the detection values obtained by the sensors if it is difficult to receive the GPS signals.

In the GPS positioning process, the PND 1 receives the GPS signals from a plurality of GPS satellites through a GPS antenna ANT1 and transmits the GPS signals to the GPS processing unit 21 in the control unit 11.

The GPS processing unit 21 obtains current position data NPD1 by accurately determining the current position of the vehicle 9 on the basis of trajectory data obtained by demodulating the GPS signals and data of distances between the vehicle 9 and the GPS satellites, and transmits the current position data NPD1 to the navigation unit 26.

The navigation unit 26 reads map data of the area including the current position of the vehicle 9 from the memory unit 12 in accordance with the current position data NPD1, and generates a map image including the current position.

The navigation unit 26 calculates the orientation of the moving direction of the vehicle 9 on the basis of the current position data NPD1, and generates a compass image GC corresponding to the orientation.

The navigation unit 26 outputs the map image including the current position of the vehicle 9 and the compass image GC to the display unit 2. The display unit 2 displays a vehicle navigation image GV shown in FIG. 8A in which the compass image GC is superimposed on the map image.

In the vehicle navigation image GV, a vehicle mark MV having the shape of an arrow is shown at the current position of the vehicle 9, and the direction in which the arrow points shows the moving direction of the vehicle 9. The vehicle navigation image GV is displayed on the display unit 2 in a so-called heading-up mode in which the map image rotates so that the moving direction of the vehicle 9 constantly points upward on the display unit 2.

In addition, in the vehicle navigation image GV, the compass image GC is displayed at the upper right section of the display unit 2. The compass image GC rotates in accordance with the change in the orientation of the moving direction of the vehicle 9.

When the vehicle 9 is, for example, behind a building or in a tunnel and it is difficult to receive the GPS signals through the GPS antenna ANT1, it is difficult for the navigation unit 26 (FIG. 7) to calculate the current position of the vehicle 9 since the current position data NPD1 is not supplied.

In such a case, the position calculation unit 25 executes the autonomous positioning process. In this process, the velocity V is calculated on the basis of the accelerations, the pitch rate, etc., detected by the three-axis acceleration sensor 4, the Y-axis gyro sensor 5, etc., and then the current position is calculated.

More specifically, the three-axis acceleration sensor 4 detects the accelerations $\alpha_x$, $\alpha_y$, and $\alpha_z$ at a sampling frequency of, for example, 50 Hz and transmits acceleration data AD representing the acceleration $\alpha_z$ to the velocity calculation unit 22 in the control unit 11.

The Y-axis gyro sensor 5 detects the pitch rate $\omega_y$ at a sampling frequency of, for example, 50 Hz and transmits pitch rate data PD representing the pitch rate $\omega_y$ to the velocity calculation unit 22 in the control unit 11.

The velocity calculation unit 22 calculates the velocity V 50 times per second by Equation (1) on the basis of the acceleration $\alpha_z$ corresponding to the acceleration data AD supplied from the three-axis acceleration sensor 4 and the pitch rate $\omega_y$ corresponding to the pitch rate data PD supplied from the Y-axis gyro sensor 5. Then, the velocity calculation unit 22 transmits velocity data VD representing the velocity V to the position calculation unit 25.

The Z-axis gyro sensor 6 detects the yaw rate $\omega_z$ at a sampling frequency of, for example, 50 Hz and transmits yaw rate data YD representing the yaw rate $\omega_z$ to the angle calculation unit 23 in the control unit 11.

The angle calculation unit 23 calculates the angle θ at the time when the vehicle 9 turns left or right by multiplying the yaw rate co, corresponding to the yaw rate data YD supplied from the Z-axis gyro sensor 6 by the sampling period (0.02 s in this case). The angle calculation unit 23 transmits angle data DD representing the angle θ to the position calculation unit 25.

The position calculation unit 25 determines the amount of change between the previous position P0 and the current position P1 shown in FIG. 6 on the basis of the velocity V corresponding to the velocity data VD supplied from the velocity calculation unit 22 and the angle θ corresponding to the angle data DD supplied from the angle calculation unit 23. The position calculation unit 25 calculates the current position P1 by adding the amount of change to the previous position P0, and transmits current position data NPD2 representing the current position P1 to the navigation unit 26.

The atmospheric pressure sensor 7 detects the ambient atmospheric pressure PR at a sampling frequency of, for example, 50 Hz and transmits atmospheric pressure data PRD representing the atmospheric pressure PR to the altitude calculation unit 24.

The altitude calculation unit 24 calculates the altitude of the vehicle 9 on the basis of the atmospheric pressure PR corresponding to the atmospheric pressure data PRD supplied from the atmospheric pressure sensor 7, and transmits altitude data HD representing the altitude to the navigation unit 26.

The navigation unit 26 reads map data of the area including the current position of the vehicle 9 from the memory unit 12 in accordance with the current position data NPD2 supplied from the position calculation unit 25 and the altitude data HD supplied from the altitude calculation unit 24, and generates a map image including the current position.

The navigation unit 26 calculates the orientation of the moving direction of the vehicle 9 on the basis of the current position data NPD2, and generates a compass image GC corresponding to the orientation.

The navigation unit 26 outputs the map image including the current position of the vehicle 9 and the compass image GC to the display unit 2. The display unit 2 displays the vehicle navigation image GV shown in FIG. 8A in which the compass image GC is superimposed on the map image.

Thus, in the in-vehicle mode, the PND 1 calculates the orientation on the basis of the current position data NPD1 or the current position data NPD2, and displays the map image on the display unit 2 together with the compass image GC in accordance with the calculated orientation.

1-4-1. Velocity Calculation Process

A velocity calculation process for calculating the velocity V will now be described. The velocity V is calculated by the velocity calculation unit 22 on the basis of the acceleration $\alpha_z$ corresponding to the acceleration data AD supplied from the three-axis acceleration sensor 4 and the pitch rate $\omega_y$ corresponding to the pitch rate data PD supplied from the Y-axis gyro sensor 5.

In the velocity calculation process, as illustrated in FIG. 9, the velocity calculation unit 22 functions as a data acquisition unit 31, a high-pass filter unit 32, a low-pass filter unit 33, a velocity computation unit 34, a smoothing and noise-reducing unit 35, and a velocity output unit 36.

The data acquisition unit 31 of the velocity calculation unit 22 acquires the acceleration data AD supplied from the three-axis acceleration sensor 4 and the pitch rate data PD supplied from the Y-axis gyro sensor 5, and transmits the acceleration data AD and the pitch rate data PD to the high-pass filter unit 32.

The high-pass filter unit 32 eliminates linear components of the acceleration data AD and the pitch rate data PD supplied from the data acquisition unit 31, and obtains acceleration data AD 1 and pitch rate data PD 1 as a result. The high-pass filter unit 32 transmits the acceleration data AD1 and the pitch rate data PD1 to the low-pass filter unit 33.

The low-pass filter unit 33 subjects the acceleration data AD1 and the pitch rate data PD1 supplied from the high-pass filter unit 32 to a low-pass filter process, and obtains acceleration data AD2 and pitch rate data PD2 as a result. The low-pass filter unit 33 transmits the acceleration data AD2 and the pitch rate data PD2 to the velocity computation unit 34.

The velocity computation unit 34 performs a velocity computation process, which will be described below, using the acceleration data AD2 and the pitch rate data PD2 supplied from the low-pass filter unit 33, and obtains velocity data VD1 as a result. The velocity computation unit 34 transmits the velocity data VD1 to the smoothing and noise-reducing unit 35.

The smoothing and noise-reducing unit 35 reduces an error included in the velocity V by subjecting the velocity data VD1 supplied from the velocity computation unit 34 to a predetermined smoothing and noise-reducing process, and obtains velocity data VD as a result. The smoothing and noise-reducing unit 35 transmits the velocity data VD to the velocity output unit 36.

The velocity output unit 36 outputs the velocity data VD supplied from the smoothing and noise-reducing unit 35 to the position calculation unit 25 as data that represents the velocity V of the vehicle 9.

In the above-described manner, the velocity calculation unit 22 calculates the velocity V of the vehicle 9 on the basis of the acceleration data AD supplied from the three-axis acceleration sensor 4 and the pitch rate data PD supplied from the Y-axis gyro sensor 5.

1-4-1-1. Low-Pass Filter Process

The low-pass filter process performed by the low-pass filter unit 33 for the acceleration data AD1 and the pitch rate data PD1 supplied from the high-pass filter unit 32 will now be described.

Here, the altitude H was measured on the basis of the atmospheric pressure PR corresponding to the atmospheric pressure data PRD supplied from the atmospheric pressure sensor 7 (FIG. 7), and an angle φ around the Y-axis with respect to the horizontal direction was measured on the basis of the pitch rate $\omega_y$ corresponding to the pitch rate data PD supplied from the Y-axis gyro sensor 5.

The result of the measurements showed that when the altitude H suddenly decreases, that is, when the vehicle 9 runs on a downward slope, the angle φ also decreases. As is clear from this result, there is a correlation between the altitude H and the angle φ.

Thus, as the altitude H varies, the angle φ also varies in accordance with the variation in the altitude H. Therefore, the PND 1 is capable of detecting the undulation of the road along the moving direction of the vehicle 9 with the Y-axis gyro sensor 5.

In addition, the measured angle φ fluctuated once or twice per second irrespective of the moving velocity of the vehicle 9. Therefore, it was found that when the PND 1 detects the pitch rate $\omega_y$ corresponding to the pitch rate data PD acquired by the Y-axis gyro sensor 5, the detected pitch rate $\omega_y$ fluctuates at 1 to 2 Hz irrespective of the moving velocity of the vehicle 9.

Figure 10:
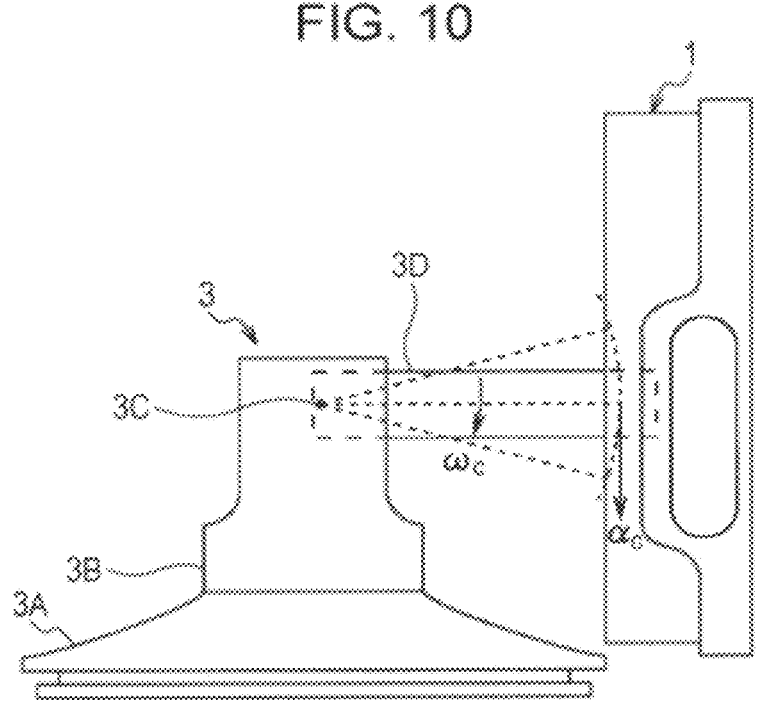
FIG. 10 is a schematic diagram illustrating vibration caused by a cradle.

The PND 1 is held by the cradle 3 that is attached to the dashboard of the vehicle 9 with the cupule 3A. As illustrated in FIG. 10, the cradle 3 includes a cradle main body 3B provided on the cupule 3A and a PND-supporting portion 3D. The PND-supporting portion 3D is supported at one end thereof by a support 3C provided on the cradle main body 3B at a predetermined height, and supports the PND 1 at the other end thereof.

Therefore, when the vehicle 9 vibrates in accordance with the undulation of the road, the PND 1 also vibrates vertically around the support 3C of the PND-supporting portion 3D at, for example, an acceleration $\alpha_c$ and an angular velocity $\omega_c$.

It was experimentally confirmed that the Y-axis gyro sensor 5 in the PND 1 detects a total angular velocity $\omega_{cy}$ obtained as the sum of the pitch rate $\omega_y$ that fluctuates at 1 to 2 Hz in accordance with the undulation of the road as described above and the angular velocity $\omega_c$ that fluctuates at about 15 Hz because of the cradle 3.

It was also confirmed that the three-axis acceleration sensor 4 in the PND 1 detects a total acceleration $\alpha_{cz}$ obtained as the sum of the acceleration $\alpha_z$ that fluctuates at 1 to 2 Hz in accordance with the undulation of the road as described above and the acceleration $\alpha_c$ that fluctuates at about 15 Hz because of the cradle 3.

Therefore, the low-pass filter unit 33 (FIG. 9) subjects the acceleration data AD1 and the pitch rate data PD1 supplied from the high-pass filter unit 32 to the low-pass filter process to remove the frequency components of about 15 Hz, that is, the acceleration $\alpha_c$ and the angular velocity $\omega_c$ generated because the PND 1 is held by the cradle 3.

Accordingly, the low-pass filter unit 33 extracts only the acceleration $\alpha_z$ generated by the undulation of the road by removing the acceleration $\alpha_c$ from the total acceleration $\alpha_{cz}$. In addition, the low-pass filter unit 33 extracts only the pitch rate $\omega_y$ generated by the undulation of the road by removing the angular velocity $\omega_c$ from the total angular velocity $\omega_{cy}$.

1-4-1-2. Velocity Computation Process

The velocity computation process in which the velocity computation unit 34 computes the velocity V on the basis of the acceleration data AD2 and the pitch rate data PD2 supplied from the low-pass filter unit 33 will now be described.

In general, the PND 1 may be mounted in the vehicle 9 at various positions. For example, the PND 1 may be mounted on the dashboard in a front section of the vehicle 9 or near a rear glass in a rear section of the vehicle 9.

Although the details will be omitted here, it was experimentally confirmed that the phase of the acceleration $\alpha_z$ detected by the PND 1 when the PND 1 is mounted in the rear section of the vehicle 9 is behind the phase of the acceleration $\alpha_z$ detected by the PND 1 when the PND 1 is mounted in the front section of the vehicle 9. Therefore, the PND 1 uses the acceleration data AD2 and the pitch rate data PD2 in a certain range.

When the velocity V of the vehicle 9 is low, the acceleration $\alpha_z$ and the pitch rate $\omega_y$ drastically vary in accordance with small changes in the road. Therefore, to comply with the drastic variations, the velocity computation unit 34 sets the range of the data to be used to 25 data points, that is, to a narrow range.

When the velocity V of the vehicle 9 is high, the influence of a suspension in the vehicle 9 is large and the acceleration $\alpha_z$ and the pitch rate $\omega_y$ vary slowly. Therefore, to comply with the slow variations, the velocity computation unit 34 sets the range of the data to be used to 75 data points, that is, to a wide range.

Figure 11:
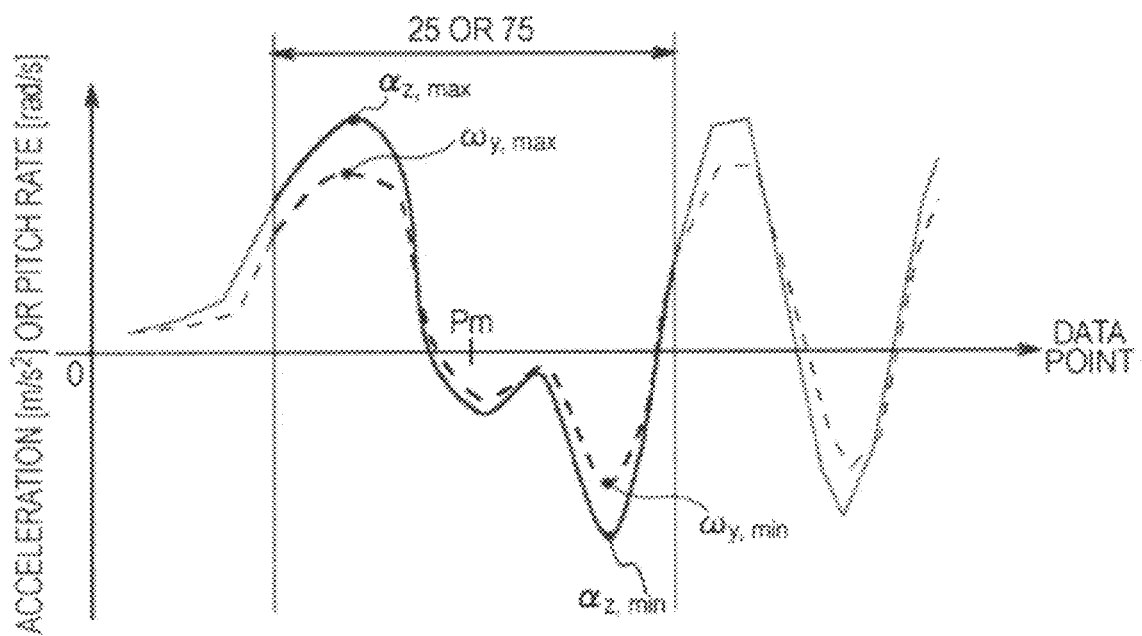
FIG. 11 is a graph illustrating the relationship between maximum and minimum values.

More specifically, referring to FIG. 11, the velocity computation unit 34 extracts a maximum value and a minimum value of the acceleration $\alpha_z$ corresponding to the acceleration data AD2 supplied from the low-pass filter unit 33 as a maximum acceleration $\alpha_{z,max}$ and a minimum acceleration $\alpha_{z,min}$, respectively, from a range including 25 or 75 data points centered on a data point Pm corresponding to the previous position P0 (FIG. 6).

In addition, the velocity computation unit 34 extracts a maximum value and a minimum value of the pitch rate $\omega_y$ corresponding to the pitch rate data PD2 supplied from the low-pass filter unit 33 as a maximum pitch rate $\omega_{y,max}$ and a minimum pitch rate $\omega_{y,min}$, respectively, from a range including 25 or 75 data points centered on the data point Pm.

Thus, the velocity computation unit 34 extracts the maximum acceleration $\alpha_{z,max}$, the minimum acceleration $\alpha_{z,min}$, the maximum pitch rate $\omega_{y,max}$, and the minimum pitch rate $\omega_{y,min}$ from a range wider than a phase shift that may occur in the acceleration $\alpha_z$ and the pitch rate $\omega_y$.

Then, the velocity computation unit 34 calculates the velocity V in the moving direction at the previous position P0 (FIG. 6) on the basis of the maximum acceleration $\alpha_{z,max}$ and the minimum acceleration $\alpha_{z,min}$ extracted from the acceleration data AD2 and the maximum pitch rate $\omega_{y,max}$ and the minimum pitch rate $\omega_{y,min}$ extracted from the pitch rate data PD2 by the following Equation (3), which is obtained by transforming Equation (1).

$$V = \frac{\alpha_{z,max} - \alpha_{z,min}}{\omega_{y,max} - \omega_{y,min}} \quad (3)$$

Then, the velocity computation unit 34 transmits the velocity data VD1 representing the velocity V to the smoothing and noise-reducing unit 35.

Thus, even when there is a phase shift in the acceleration $\alpha_z$ and the pitch rate $\omega_y$, the velocity computation unit 34 can calculate the velocity V without being influenced by the phase shift by using Equation (3).

As described above, the velocity computation unit 34 switches the data range from which the maximum acceleration $\alpha_{z,max}$, the minimum acceleration $\alpha_{z,min}$, the maximum pitch rate $\omega_{y,max}$, and the minimum pitch rate $\omega_{y,min}$ are extracted in accordance with the velocity V of the vehicle 9. Therefore, the conditions of the road and the vehicle 9 can be reflected in accordance with the velocity V, and the accuracy of calculation of the velocity V can be increased.

Figure 12:
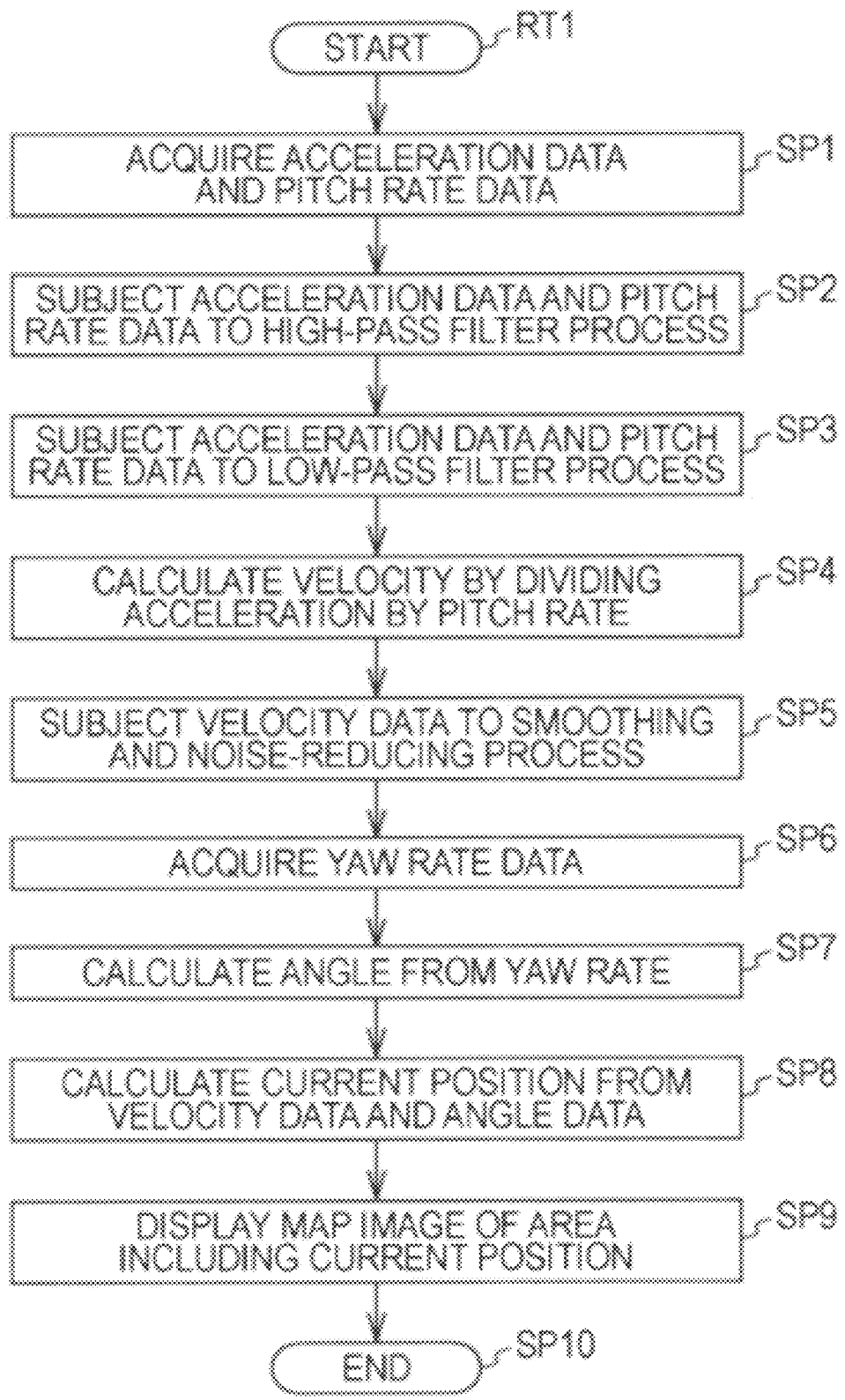
FIG. 12 is a flowchart illustrating the procedure of a current-position calculation process using a velocity calculation process.

1-4-2. Procedure of Position Calculation Process Based on Velocity Calculation Process A procedure of a position calculation process in which the control unit 11 in the PND 1 calculates the current position on the basis of the above-described velocity calculation process will now be described with reference to the flowchart shown in FIG. 12.

The control unit 11 starts at the starting step of routine RT1 and proceeds to step SP1, where the data acquisition unit 31 in the velocity calculation unit 22 acquires the acceleration data AD detected by the three-axis acceleration sensor 4 and the pitch rate data PD detected by the Y-axis gyro sensor 5. Then, the control unit 11 proceeds to step SP2.

In step SP2, the control unit 11 causes the high-pass filter unit 32 in the velocity calculation unit 22 to perform the high-pass filter process for the acceleration data AD and the pitch rate data PD, and proceeds to step SP3.

In step SP3, the control unit 11 causes the low-pass filter unit 33 in the velocity calculation unit 22 to perform the low-pass filter process, for example, a fourth-order IIR filter process with a cut-off frequency of 1 Hz, for the acceleration data AD 1 and the pitch rate data PD 1 obtained as a result of the high-pass filter process. Then, the control unit 11 proceeds to step SP4.

In step SP4, the control unit 11 causes the velocity computation unit 34 in the velocity calculation unit 22 to calculate the velocity V by Equation (3) on the basis of the acceleration $\alpha_z$ and the pitch rate $\omega_y$ corresponding to the acceleration data AD2 and the pitch rate data PD2, respectively, obtained as a result of the low-pass filter process. Then, the control unit 11 proceeds to step SP5.

In step SP5, the control unit 11 subjects the velocity data VD representing the velocity V calculated in step SP4 to the smoothing and noise-reducing process.

More specifically, the control unit 11 subjects the velocity data VD1 representing the velocity V calculated in step SP4 to a low-pass filter process with a variable cut-off frequency, and proceeds to step SP6.

In step SP6, the control unit 11 causes the angle calculation unit 23 to acquire the yaw rate data YD obtained by the Z-axis gyro sensor 6, and proceeds to step SP7.

In step SP7, the control unit 11 causes the angle calculation unit 23 to obtain the angle data DD representing the angle θ calculated by multiplying the yaw rate $\omega_z$ corresponding to the yaw rate data YD by the sampling period, which is 0.02 s. Then, the control unit 11 proceeds to step SP8.

In step SP8, the control unit 11 calculates the current position data NPD2 on the basis of the velocity data VD obtained as a result of the smoothing and noise-reducing process performed in step SP5 and the angle data DD obtained in step SP7. Then, the control unit 11 proceeds to step SP9.

In step SP9, the control unit 11 reads the map data of the area including the current position of the vehicle 9 from the memory unit 12 in accordance with the current position data NPD2 supplied from the position calculation unit 25. Then, the control unit 11 generates a map image including the current position, outputs the map image to the display unit 2, and proceeds to step SP10, where the process is terminated.

1-5. On-Foot Mode

Next, the on-foot mode selected when the PND 1 is detached from the vehicle 9 will be described. The control unit 11 (FIG. 7) switches the PND 1 to the on-foot mode if the cradle detection unit 17 detects that the PND 1 is detached from the cradle 3.

In the on-foot mode, the control unit 11 functions not only as the GPS processing unit 21 and the navigation unit 26 as in the in-vehicle mode but also as an attitude-angle detection unit 27 and an orientation calculation unit 28.

The attitude-angle detection unit 27 acquires acceleration data AD3 representing the accelerations $\alpha_x$, $\alpha_y$, and $\alpha_z$ from the three-axis acceleration sensor 4. Subsequently, the attitude-angle detection unit 27 detects an attitude angle AA that shows the inclination of the PND 1 with respect to the ground plane on the basis of the acquired acceleration data AD3, and supplies attitude angle data AAD representing the attitude angle AA to the orientation calculation unit 28.

In addition, as described above, the PND 1 is provided with the geomagnetic sensor 8 that can detect geomagnetism in the three-axis directions. The geomagnetic sensor 8 detects the geomagnetism, and supplies geomagnetic data TMD representing geomagnetic values M corresponding to a three-dimensional geomagnetic vector to the orientation calculation unit 28.

The orientation calculation unit 28 calculates the orientation C on the basis of the geomagnetic values M corresponding to the geomagnetic data TMD supplied from the geomagnetic sensor 8 and the attitude angle AA corresponding to the attitude angle data AAD supplied from the attitude-angle detection unit 27. Then, the orientation calculation unit 28 supplies orientation data CD representing the orientation C to the navigation unit 26.

The navigation unit 26 reads map data of the area including the current position of the user who carries the PND 1 from the memory unit 12 in accordance with the current position data NPD1 obtained by the GPS processing unit 21, and generates a map image including the current position.

The navigation unit 26 generates a compass image GC corresponding to the orientation C represented by the orientation data CD. The navigation unit 26 outputs the map image including the current position of the user and the compass image GC to the display unit 2. The display unit 2 displays an on-foot navigation image GW shown in FIG. 8B in which the compass image GC is superimposed on the map image.

In the on-foot navigation image GW, a user mark MW having the shape of a human body is shown at the current position of the user, and the direction from feet to head shows the moving direction of the user. Similar to the vehicle navigation image GV, the on-foot navigation image GW is also displayed on the display unit 2 in the heading-up mode.

In addition, similar to the vehicle navigation image GV, in the on-foot navigation image GW, the compass image GC is displayed at the upper right section of the display unit 2. The compass image GC rotates in accordance with the change in the orientation of the moving direction of the user.

As described above, the cradle detection unit 17 (FIG. 7) periodically detects whether or not the PND 1 is attached to the cradle 3. The cradle detection unit 17 supplies the cradle detection signal CTD that represents the result of the detection to the operation control unit 29.

The operation control unit 29 performs a control process for activating or deactivating the geomagnetic sensor 8, the orientation calculation unit 28, and the attitude-angle detection unit 27, on the basis of the cradle detection signal CTD (this will be described in detail below).

Owing to the characteristics of the geomagnetic sensor 8, the geomagnetic sensor 8 is affected by a magnetic body made of a metal or the like disposed around the geomagnetic sensor 8 or by magnetization of metal components, such as a shield plate (not shown), disposed in the PND 1. Therefore, the geomagnetic data TMD generally includes an error.

Accordingly, when the orientation calculation unit 28 in the control unit 11 starts receiving the geomagnetic data TMD representing the geomagnetic values $M_x$, $M_y$, and $M_Z$ from the geomagnetic sensor 8, a predetermined initialization process is performed to set a correction value for correcting the geomagnetic data TMD and a threshold or the like that indicates a normal value range (hereinafter referred to as learning values LN).

In the initialization process, the orientation calculation unit 28 displays a message saying, for example, "move the device in a figure eight motion" on the display unit 2 to prompt the user to move the overall body of the PND 1 along a trajectory in the shape of number 8. The geomagnetic data TMD obtained during this time is used to generate the learning values LN.

Subsequently, the orientation calculation unit 28 corrects the geomagnetic data TMD by subjecting the geomagnetic data TMD to a predetermined correcting process using the correction value obtained as the learning value LN, and generates the orientation data CD on the basis of the corrected geomagnetic data TMD.

The magnetization of metal components or the like provided in the PND 1 may vary when the user who carries the PND 1 passes through an area where a strong magnetic field exists. Such a variation in magnetization affects the geomagnetic data TMD.

Therefore, the orientation calculation unit 28 determines whether or not the geomagnetic data TMD acquired from the geomagnetic sensor 8 is in a normal range on the basis of the threshold obtained as the learning value LN, and generates the orientation data CD based on the geomagnetic data TMD only when the geomagnetic data TMD is in the normal range.

If the geomagnetic data TMD acquired from the geomagnetic sensor 8 is not in the normal range, the orientation calculation unit 28 adequately updates the learning values LN including the correction value and the threshold on the basis of the geomagnetic data TMD.

1-5-1. Orientation Calculation Process

Next, an orientation calculation process will be described. In the orientation calculation process, the orientation calculation unit 28 calculates the orientation C on the basis of the geomagnetic values M corresponding to the geomagnetic data TMD supplied from the geomagnetic sensor 8 and the attitude angle AA corresponding to the attitude angle data AAD supplied from the attitude-angle detection unit 27.

Here, a ground coordinate system is defined such that the positive direction of a ground X-axis is the northward direction along the ground plane, the positive direction of a ground Y-axis is the eastward direction along the ground plane, and the positive direction of a ground Z-axis is the direction of gravity.

In addition, inclination angles of the PND 1 around the ground X-axis and the ground Y-axis with respect to the ground plane (that is, the plane including the ground X-axis and the ground Y-axis) is defined as a roll angle A and a pitch angle B, respectively.

The three-axis acceleration sensor 4 detects the accelerations $\alpha_x$, $\alpha_y$, and $\alpha_z$ and transmits the acceleration data AD3 representing the accelerations $\alpha_x$, $\alpha_y$, and $\alpha_z$ to the attitude-angle detection unit 27 in the control unit 11.

The attitude-angle detection unit 27 detects the attitude angle AA including the roll angle A and the pitch angle B on the basis of the accelerations $\alpha_x$, $\alpha_y$, and $\alpha_z$ corresponding to the acceleration data AD supplied from the three-axis acceleration sensor 4, and supplies the attitude angle data AAD representing the attitude angle AA to the orientation calculation unit 28.

The orientation calculation unit 28 performs an inclination correction calculation for eliminating the influence of inclination of the PND 1 with respect to the ground plane from the geomagnetic values M corresponding to the geomagnetic data TMD supplied from the geomagnetic sensor 8. The inclination correction calculation is performed using the attitude angle AA corresponding to the attitude angle data AAD supplied from the attitude-angle detection unit 27.

Figure 13:
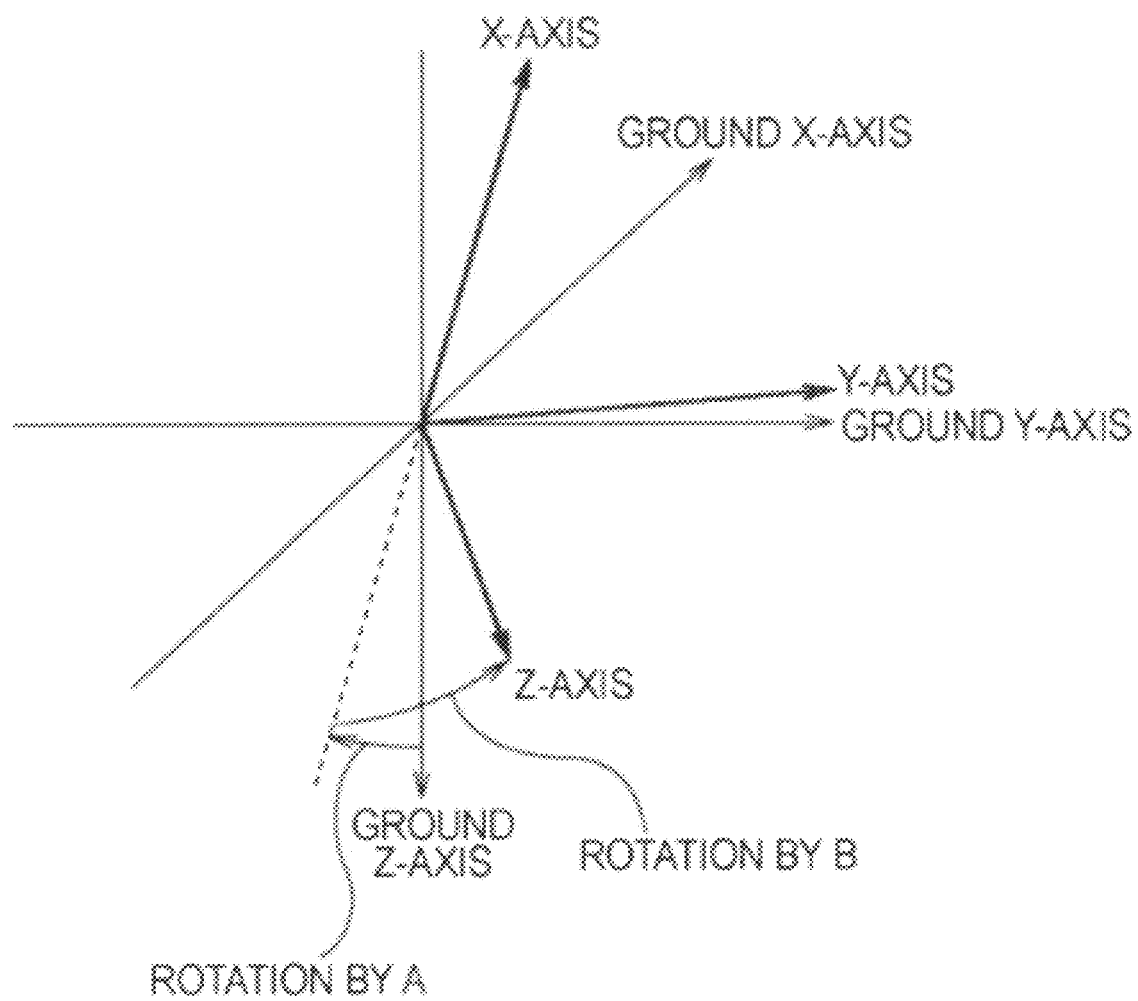
FIG. 13 is a schematic diagram illustrating the correction of a geomagnetic vector.

The inclination correction calculation will now be described. Referring to FIG. 13, it is assumed that the PND 1 (not shown) is rotated by the roll angle A around the ground X-axis and by the pitch angle B around the ground Y-axis from the state in which the PND 1 is positioned parallel to the ground plane such that the X-axis of the PND 1 extends along the ground X-axis.

The orientation calculation unit 28 (FIG. 7) calculates geomagnetic values $ME_x$, $ME_y$, and $ME_z$ in the state in which the PND 1 is positioned parallel to the ground plane such that the X-axis of the PND 1 extends along the ground X-axis. The geomagnetic values $ME_x$, $ME_y$, and $ME_z$ are calculated by the following Equation (4) from the geomagnetic values $M_x$, $M_y$, and $M_z$ which define a three-dimensional geomagnetic vector and which are supplied from the geomagnetic sensor 8.

$$\begin{pmatrix} ME_x \\ ME_y \\ ME_z \end{pmatrix} = \begin{pmatrix} 1 & 0 & 0 \\ 0 & \cos A & -\sin A \\ 0 & \sin A & \cos A \end{pmatrix} \begin{pmatrix} \cos B & 0 & -\sin B \\ 0 & 1 & 0 \\ \sin B & 0 & \cos B \end{pmatrix} \begin{pmatrix} M_x \\ M_y \\ M_z \end{pmatrix} \quad (4)$$

Then, the orientation calculation unit 28 calculates the orientation C of the PND 1 as in Equation (5) given below. In Equation (5), the range of arc cos is 0 to 180 degrees. Then, the orientation calculation unit 28 supplies the orientation data CD representing the orientation C calculated by Equation (5) to the navigation unit 26.

$$C = \arccos\left(\frac{ME_x}{\sqrt{ME_x^2 + ME_y^2}}\right) \text{ (when } ME_y \geq 0\text{)} \quad (5)$$

$$C = -\arccos\left(\frac{ME_x}{\sqrt{ME_x^2 + ME_y^2}}\right) \text{ (when } ME_y < 0\text{)}$$

Thus, the orientation calculation unit 28 calculates the orientation C on the basis of the geomagnetic values M corresponding to the geomagnetic data TMD supplied from the geomagnetic sensor 8 and the attitude angle AA corresponding to the attitude angle data AAD supplied from the attitude-angle detection unit 27.

1-6. Operation Control Process

As described above, when the PND 1 is mounted in the vehicle 9, the geomagnetic sensor 8 continuously operates even though it is difficult for the geomagnetic sensor 8 to detect the geomagnetic values M representing the accurate orientation. Therefore, there is a possibility that the electric power for operating the geomagnetic sensor 8 will be wasted.

Accordingly, the operation control unit 29 (FIG. 7) acquires the cradle detection signal CTD indicating whether or not the PND 1 is attached to the cradle 3 from the cradle detection unit 17.

When the PND 1 is attached to the cradle 3, it is assumed that the PND 1 is attached to the vehicle 9. In this case, it is difficult for the geomagnetic sensor 8 to detect the geomagnetic values M representing the accurate orientation. Therefore, the operation control unit 29 deactivates the geomagnetic sensor 8.

Accordingly, the PND 1 is prevented from consuming the electric power for operating the geomagnetic sensor 8.

In addition, in this case, the geomagnetic data TMD is not supplied to the orientation calculation unit 28 from the geomagnetic sensor 8. Therefore, the operation control unit 29 also deactivates the orientation calculation unit 28 and the attitude-angle detection unit 27 that supplies the attitude angle data AAD to the orientation calculation unit 28.

Accordingly, the PND 1 can reduce the software load applied when the orientation calculation unit 28 and the attitude-angle detection unit 27 are operated. As a result, the PND 1 is prevented from consuming the electric power for operating the orientation calculation unit 28 and the attitude-angle detection unit 27.

Thus, when the PND 1 is attached to the cradle 3, the PND 1 causes the operation control unit 29 to deactivate the geomagnetic sensor 8, the orientation calculation unit 28, and the attitude-angle detection unit 27.

While deactivating the geomagnetic sensor 8, the orientation calculation unit 28, and the attitude-angle detection unit 27 is one possibility to reduce software load when the PND 1 is detected as being attached to the cradle 3, various other implementations are possible.

For example, the operation control unit 29 may deactivate only the orientation calculation unit 28, while keeping the geomagnetic sensor 8 and the attitude-angle detection unit 27 in an active state. The operation control unit 29 may also keep the orientation calculation unit 28 active, but control the orientation calculation unit 28 to not calculate an orientation, thus effectively ignoring signals received from the geomagnetic sensor 8 and the attitude-angle detection unit 27. The operation control unit 29 may also deactivate any one or more of the geomagnetic sensor 8, the orientation calculation unit 28, and the attitude-angle detection unit 27 to reduce software load when the PND 1 is detected as being attached to the cradle 3.

The result of deactivating any one of the geomagnetic sensor 8, the orientation calculation unit 28, and/or the attitude-angle detection unit 27, or controlling the orientation calculation unit 28 to ignore signals received from either of the geomagnetic sensor 8 or the attitude-angle detection unit 27 is to control the orientation calculation unit 28 to not calculate an orientation of the PND 1.

When the PND 1 is not attached to the cradle 3, it is assumed that the PND 1 is not attached to the vehicle 9. In this case, the geomagnetic sensor 8 can detect the geomagnetic values M representing the accurate orientation. Therefore, the operation control unit 29 activates the geomagnetic sensor 8, the orientation calculation unit 28, and the attitude-angle detection unit 27.

Thus, the PND 1 causes the cradle detection unit 17 to detect whether or not the PND 1 is attached to the cradle 3. If the PND 1 is separated from the cradle 3, that is, if the PND 1 is detached from the vehicle 9, the geomagnetic sensor 8, the orientation calculation unit 28, and the attitude-angle detection unit 27 are activated.

If the PND 1 is attached to the vehicle 9 and it is difficult to detect the geomagnetic values M representing the accurate orientation, the PND 1 deactivates the geomagnetic sensor 8.

Next, the procedure of the operation control process will be described with reference to the flowchart in FIG. 14. In the operation control process, the control unit 11 in the PND 1 activates or deactivates the geomagnetic sensor 8, the orientation calculation unit 28, and the attitude-angle detection unit 27 in accordance with whether or not the PND 1 is mounted in the vehicle 9.

When the power of the PND 1 is turned on, the control unit 11 starts at the starting step of routine RT2, and proceeds to step SP21, where an initialization completion flag, which indicates whether or not the initialization of the learning values LN is completed, is turned off. Then, the control unit 11 proceeds to step SP22.

In step SP22, the control unit 11 determines whether or not the PND 1 is attached to the cradle 3 on the basis of the result of the detection performed by the cradle detection unit 17. If the result of the determination is NO, it means that the PND 1 is carried out of the vehicle 9 and that the orientation data CD is to be generated. In this case, the control unit 11 proceeds to step SP23.

In step SP23, the control unit 11 determines whether or not the initialization process is completed on the basis of the state of the initialization completion flag. If the result of the determination is NO, it means that the initialization process is not yet performed. In this case, the control unit 11 proceeds to step SP24.

In step SP24, the control unit 11 causes the operation control unit 29 to start the operations of the geomagnetic sensor 8, the orientation calculation unit 28, and the attitude-angle detection unit 27, and causes the orientation calculation unit 28 to perform the initialization process for obtaining the learning values LN. Then, the control unit 11 turns on the initialization completion flag, and proceeds to step SP25.

More specifically, when the power-off state is switched to the power-on state and the initialization process is not yet performed, the control unit 11 executes the initialization process for obtaining the learning values LN in step SP24.

If the result of the determination performed in step SP23 is YES, it means that it is not necessary to perform the initialization process. In this case, the control unit 11 proceeds to step SP25.

Figure 8A:
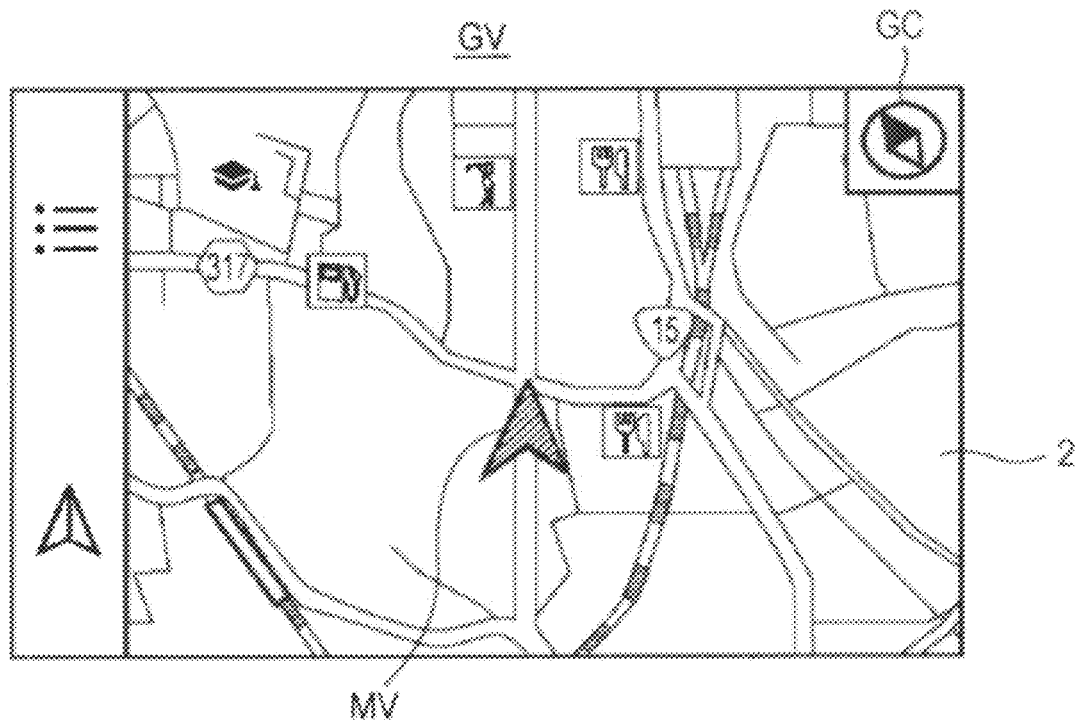
FIGS. 8A and 8B are schematic diagrams illustrating examples of navigation displays.
Figure 8B:
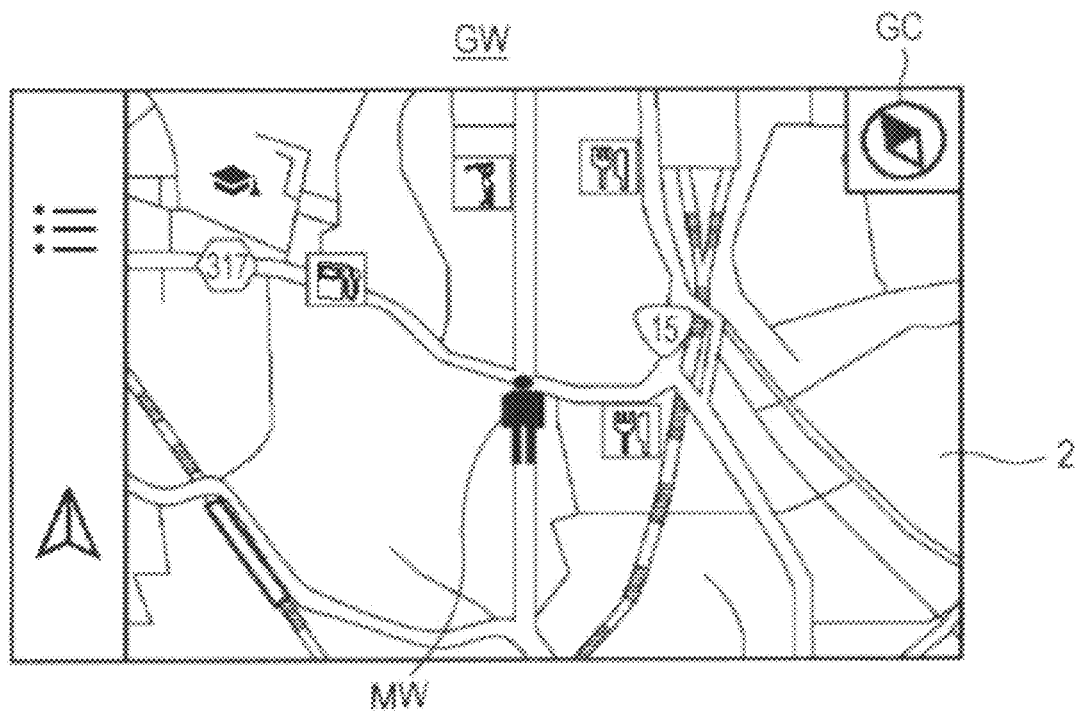

In step SP25, the control unit 11 operates the PND 1 in the on-foot mode and displays the on-foot navigation image GW shown in FIG. 8B on the display unit 2. Then, the control unit 11 proceeds to step SP28.

If the result of the determination performed in step SP22 is YES, it means that the PND 1 is mounted in the vehicle 9 and it is difficult to generate the orientation data CD representing the correct orientation. In this case, the control unit 11 proceeds to step SP26.

In step SP26, the control unit 11 causes the operation control unit 29 to deactivate the geomagnetic sensor 8, the orientation calculation unit 28, and the attitude-angle detection unit 27, and turns off the initialization completion flag. Then, the control unit 11 proceeds to step SP27.

If the geomagnetic sensor 8, the orientation calculation unit 28, and the attitude-angle detection unit 27 are already deactivated, the control unit 11 maintains that state. In addition, if the initialization completion flag is already off, the control unit 11 maintains that state.

In step SP27, the control unit 11 operates the PND 1 in the in-vehicle mode and displays the vehicle navigation image GV shown in FIG. 8A on the display unit 2. Then, the control unit 11 proceeds to step SP28.

In step SP28, the control unit 11 waits for a predetermined time period, and then returns to step SP22 and repeats the above-described steps.

If the power of the PND 1 is turned off, the control unit 11 terminates the routine RT2 of the operation control process.

1-7. Operation and Effect

In the above-described structure, the PND 1 is provided with the geomagnetic sensor 8 that detects the values M of geomagnetism applied to the PND 1 and the cradle detection unit 17 that determines whether or not the PND 1 is attached to the cradle 3.

When the PND 1 is attached to the cradle 3, it is assumed that the PND 1 is attached to the vehicle 9. Therefore, the PND 1 is operated in the in-vehicle mode.

In this case, it is difficult for the geomagnetic sensor 8 to detect the geomagnetic values M representing the accurate orientation. Therefore, the operation control unit 29 deactivates the geomagnetic sensor 8. Accordingly, the PND 1 is prevented from consuming the electric power for operating the geomagnetic sensor 8.

In addition, the operation control unit 29 also deactivates the orientation calculation unit 28 and the attitude-angle detection unit 27 that supplies the attitude angle data AAD to the orientation calculation unit 28.

Accordingly, the PND 1 can reduce the software load applied when the orientation calculation unit 28 and the attitude-angle detection unit 27 are operated. As a result, the PND 1 is prevented from consuming the electric power for operating the orientation calculation unit 28 and the attitude-angle detection unit 27. Thus, the PND 1 can further reduce the electric power consumption of the PND 1 itself.

When the PND 1 is not attached to the cradle 3, it is assumed that the PND 1 is not attached to the vehicle 9 and is carried by the user. Accordingly, the PND 1 is operated in the on-foot mode.

In this case, the geomagnetic sensor 8 can detect the geomagnetic values M representing the accurate orientation. Therefore, the operation control unit 29 activates the geomagnetic sensor 8.

In the on-foot mode, the PND 1 calculates the orientation C on the basis of the geomagnetic data TMD supplied from the geomagnetic sensor 8 and displays the compass image GC on the display unit 2 on the basis of the calculated orientation C.

In the in-vehicle mode, the PND 1 calculates the orientation on the basis of the current position data NPD1 and the current position data NPD2 and displays the compass image GC on the display unit 2 on the basis of the calculated orientation.

Thus, the PND 1 displays the compass image GC to present the orientation to the user in either of the in-vehicle mode and the on-foot mode.

The PND 1 automatically switches between the in-vehicle mode and the on-foot mode in accordance with whether or not the PND 1 is removed from the cradle 3. Therefore, it is not necessary for the user to perform a cumbersome operation of switching between the two modes.

In the above-described structure, the PND 1 is provided with the geomagnetic sensor 8 that detects the values M of geomagnetism applied to the PND 1 and the cradle detection unit 17 that determines whether or not the PND 1 is attached to the cradle 3. When the PND 1 is attached to the cradle 3, the operation control unit 29 deactivates the geomagnetic sensor 8, the orientation calculation unit 28, and the attitude-angle detection unit 27. When the PND 1 is not attached to the cradle 3, the operation control unit 29 activates the geomagnetic sensor 8, the orientation calculation unit 28, and the attitude-angle detection unit 27. Thus, the PND 1 activates the geomagnetic sensor 8 when the PND 1 is detached from the vehicle 9 and deactivates the geomagnetic sensor 8 when the PND 1 is attached to the vehicle 9, which is when it is difficult to detect the geomagnetic values M representing the accurate orientation.

2. Second Embodiment

Figure 15:
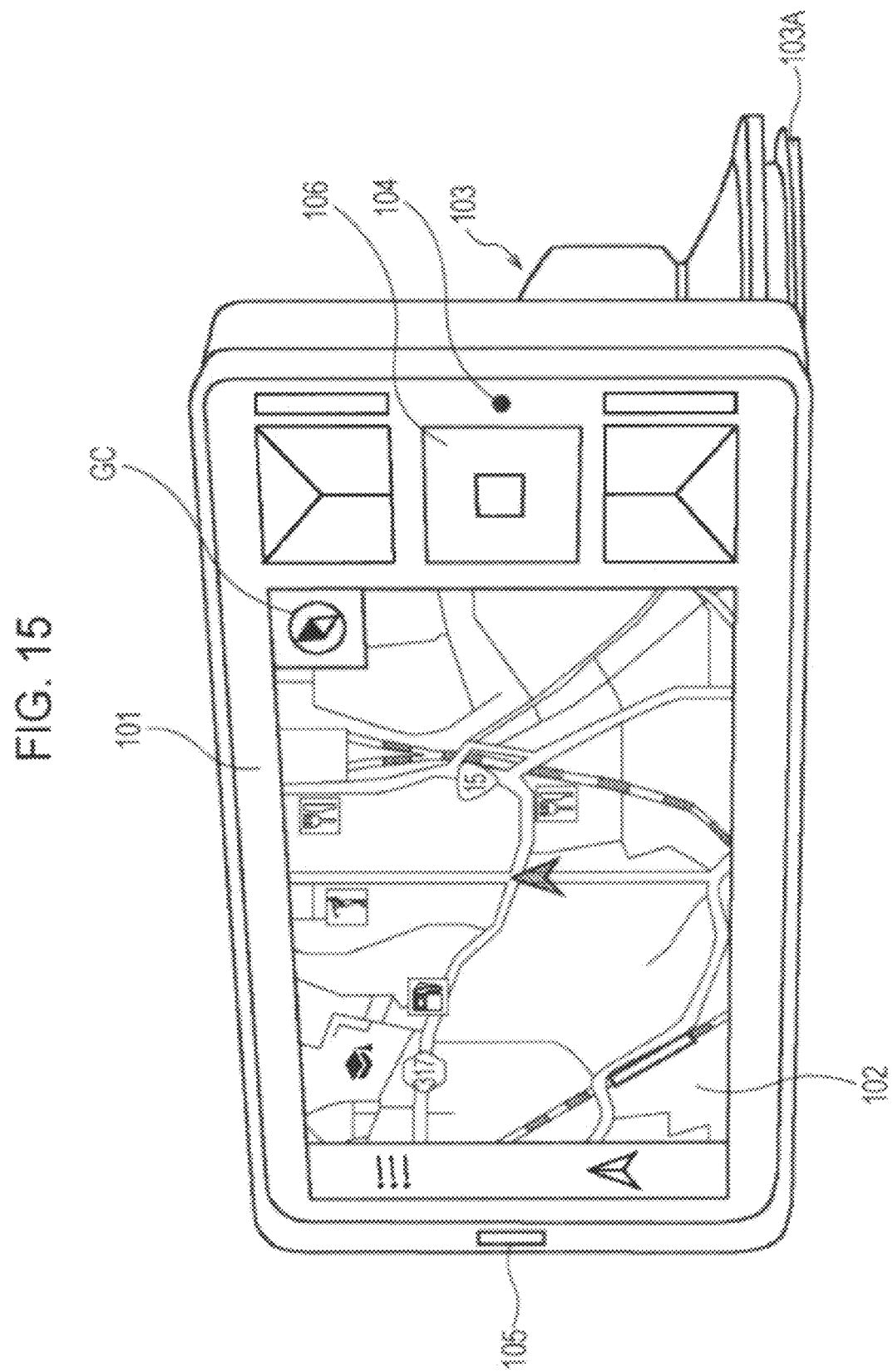
FIG. 15 is a schematic diagram illustrating the overall structure of a mobile phone apparatus.

FIG. 15 illustrates a mobile phone apparatus 101 according to a second embodiment. Similar to the PND 1 according to the first embodiment, the mobile phone apparatus 101 has a navigation function.

As illustrated in FIG. 15, the mobile phone apparatus 101 is provided with a display unit 102 composed of liquid crystal display (LCD) at a front side of the mobile phone apparatus 101. A map image, an electronic mail, etc., corresponding to data stored in, for example, a nonvolatile memory (not shown) installed in the mobile phone apparatus 101 can be displayed on the display unit 102.

An operation unit 106 including input buttons, a microphone 104, and a speaker 105 are provided at the front side of the mobile phone apparatus 101.

Similar to the PND 1 according to the first embodiment, the mobile phone apparatus 101 can be attached to the vehicle 9 with a cradle 103.

As illustrated in FIG. 16, the mobile phone apparatus 101 includes an integrated control unit 109 composed of a CPU. The integrated control unit 109 controls a mobile phone unit 110 that provides the functions as a mobile phone apparatus.

The mobile phone apparatus 101 includes a navigation unit similar to the navigation unit 10 shown in FIG. 7 that provides the navigation function in the above-described PND 1, and the navigation unit 10 is controlled by the integrated control unit 109. The structure of the navigation unit is similar to that of the navigation unit 10 shown in FIG. 7, and explanations thereof are thus omitted.

The mobile phone unit 110 includes a mobile-phone control unit 114 composed of a CPU. The mobile-phone control unit 114 controls the overall operation of the mobile phone unit 110 using a basic program read from a memory unit 108, such as a nonvolatile memory.

The mobile phone unit 110 is connected to the display unit 102 and the operation unit 106, and is also connected to the memory unit 108 composed of a semiconductor memory or the like and used to store various data. Although not illustrated in FIG. 16, the display unit 102, the operation unit 106, and the memory unit 108 are also connected to the navigation unit 10.

The mobile phone apparatus 101 uses the mobile phone unit 110 to provide a communication function for transmitting and receiving electronic mails and a telephone function. The mobile phone unit 110 in the mobile phone apparatus 101 receives signals from a base station (not shown) through an antenna ANT2 and transmits the received signals to a transmitting-and-receiving unit 111.

The transmitting-and-receiving unit 111 includes a transmitting section and a receiving section. The transmitting-and-receiving unit 111 demodulates, for example, the received signals by a predetermined method to convert the signals into reception data, and transmits the reception data to a decoder 112. The decoder 112 restores data of the voice of the person at the other end by decoding the reception data under the control of the mobile-phone control unit 114, and outputs the restored data to the speaker 105. The speaker 105 outputs the voice of the person at the other end on the basis of the voice data.

In addition, the mobile phone unit 110 collects voice signals through the microphone 104 and transmits the collected voice signals to an encoder 115. The encoder 115 converts the voice signals into digital data under the control of the mobile-phone control unit 114, and then encodes the digital data by a predetermined method to generate voice data. The encoder 115 outputs the voice data to the transmitting-and-receiving unit 111.

The transmitting-and-receiving unit 111 modulates the voice data by a predetermined method, and transmits the modulated voice data to the base station (not shown) by radio through the antenna ANT2.

At this time, the mobile-phone control unit 114 in the mobile phone unit 110 displays the phone number of the person at the other end, a radio-wave reception status, etc., on the display unit 102 in accordance with operation commands input through the operation unit 106.

In addition, when an electronic mail is received by the communication function, the mobile-phone control unit 114 in the mobile phone unit 110 supplies the received data to the decoder 112 through the transmitting-and-receiving unit 111. The decoder 112 decodes the received data to restore electronic mail data, and outputs the restored electronic mail data to the display unit 102. The electronic mail is displayed on the display unit 102 and stored in the memory unit 108.

In addition, when an electronic mail is transmitted by the communication function, the mobile-phone control unit 114 in the mobile phone unit 110 causes the encoder 115 to encode the electronic mail data input through the operation unit 106. The encoded electronic mail data is transmitted through the transmitting-and-receiving unit 111 and the antenna ANT2 by radio.

Figure 14:
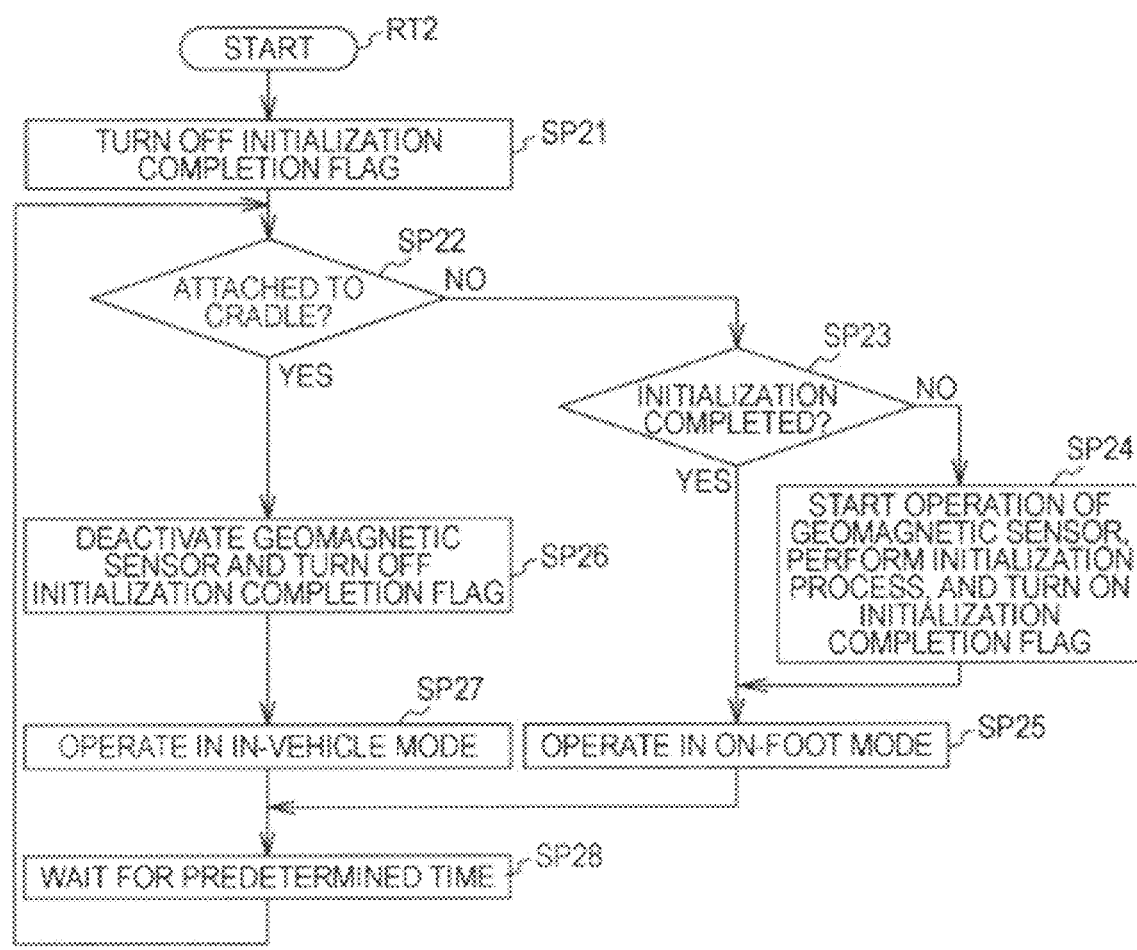
FIG. 14 is a flowchart illustrating the procedure of an operation control process.

When the mobile phone apparatus 101 executes the navigation function, the integrated control unit 109 controls the navigation unit 10 so as to execute the above-described procedure of the operation control process (FIG. 14).

More specifically, the mobile phone apparatus 101 is provided with the geomagnetic sensor 8 (FIG. 7) that detects the values M of geomagnetism applied to the mobile phone apparatus 101 and the cradle detection unit 17 (FIG. 7) that determines whether or not the mobile phone apparatus 101 is attached to the cradle 103.

When the mobile phone apparatus 101 is attached to the cradle 103, it is assumed that the mobile phone apparatus 101 is attached to the vehicle 9. Therefore, the mobile phone apparatus 101 is operated in the in-vehicle mode.

In this case, it is difficult for the geomagnetic sensor 8 to detect the geomagnetic values M representing the accurate orientation. Therefore, the operation control unit 29 deactivates the geomagnetic sensor 8. Accordingly, the mobile phone apparatus 101 is prevented from consuming the electric power for operating the geomagnetic sensor 8.

In addition, the operation control unit 29 also deactivates the orientation calculation unit 28 and the attitude-angle detection unit 27 that supplies the attitude angle data AAD to the orientation calculation unit 28.

Accordingly, the mobile phone apparatus 101 can reduce the software load applied when the orientation calculation unit 28 and the attitude-angle detection unit 27 are operated. As a result, the mobile phone apparatus 101 is prevented from consuming the electric power for operating the orientation calculation unit 28 and the attitude-angle detection unit 27. Thus, the mobile phone apparatus 101 can further reduce the electric power consumption of the mobile phone apparatus 101 itself.

While deactivating the geomagnetic sensor 8, the orientation calculation unit 28, and the attitude-angle detection unit 27 is one possibility to reduce software load when the mobile phone apparatus 101 is detected as being attached to the cradle 103, various other implementations are possible.

For example, the operation control unit 29 may deactivate only the orientation calculation unit 28, while keeping the geomagnetic sensor 8 and the attitude-angle detection unit 27 in an active state. The operation control unit 29 may also keep the orientation calculation unit 28 active, but control the orientation calculation unit 28 to not calculate an orientation, thus effectively ignoring signals received from the geomagnetic sensor 8 and the attitude-angle detection unit 27. The operation control unit 29 may also deactivate any one or more of the geomagnetic sensor 8, the orientation calculation unit 28, and the attitude-angle detection unit 27 to reduce software load when the mobile phone apparatus 101 is detected as being attached to the cradle 103.

The result of deactivating any one of the geomagnetic sensor 8, the orientation calculation unit 28, and/or the attitude-angle detection unit 27, or controlling the orientation calculation unit 28 to ignore signals received from either of the geomagnetic sensor 8 or the attitude-angle detection unit 27 is to control the orientation calculation unit 28 to not calculate an orientation of the mobile phone apparatus 101.

When the mobile phone apparatus 101 is not attached to the cradle 103, it is assumed that the mobile phone apparatus 101 is not attached to the vehicle 9 and is carried by the user. Accordingly, the mobile phone apparatus 101 is operated in the on-foot mode.

In this case, the geomagnetic sensor 8 can detect the geomagnetic values M representing the accurate orientation. Therefore, the operation control unit 29 activates the geomagnetic sensor 8.

In the on-foot mode, the mobile phone apparatus 101 calculates the orientation C on the basis of the geomagnetic data TMD supplied from the geomagnetic sensor 8 and displays the compass image GC on the display unit 102 on the basis of the calculated orientation C.

In the in-vehicle mode, the mobile phone apparatus 101 calculates the orientation C on the basis of the current position data NPD1 and the current position data NPD2 and displays the compass image GC on the display unit 102 on the basis of the calculated orientation C.

Thus, the mobile phone apparatus 101 displays the compass image GC to present the orientation to the user in either of the in-vehicle mode and the on-foot mode.

3. Other Embodiments

In the above-described embodiments, the geomagnetic sensor 8, the orientation calculation unit 28, and the attitude-angle detection unit 27 are deactivated when the PND 1 is attached to the vehicle 9.

The present invention is not limited to this, and the control process may also be performed such that only the geomagnetic sensor 8 is deactivated. However, the electric power consumption can be further reduced if the orientation calculation unit 28 and the attitude-angle detection unit 27 are additionally deactivated.

In addition, in the above-described embodiments, the orientation calculation unit 28 calculates the orientation C by performing the inclination correction calculation using the attitude angle data AAD to eliminate the influence of inclination of the PND 1 with respect to the ground plane from the geomagnetic data TMD.

The present invention is not limited to this, and the orientation calculation unit 28 may calculate the orientation C on the basis of only the geomagnetic values M corresponding to the geomagnetic data TMD supplied from the geomagnetic sensor 8. However, in the case where the PND 1 or the mobile phone apparatus 101 is inclined with respect to the ground plane, the orientation C can be more accurately calculated when the inclination correction calculation is performed.

In addition, in the above-described embodiments, the current position data NPD2 is calculated on the basis of the data detected by the three-axis acceleration sensor 4, the Y-axis gyro sensor 5, and the Z-axis gyro sensor 6.

The present invention is not limited to this, and the current position data may be calculated on the basis of data obtained by various sensors. For example, as described in Japanese Unexamined Patent Application Publication No. 2008-076374, the velocity and the angular velocity of the vehicle may be determined using an acceleration sensor, an atmospheric pressure sensor, and a gyro sensor, and the current position data may be calculated on the basis of the velocity and the angular velocity of the vehicle.

In addition, in the above-described embodiments, the user is prompted to move the PND 1 in a figure eight motion in the initialization process.

The present invention is not limited to this, and the initialization process may be performed by various methods. For example, the PND 1 may be simply rotated. In addition, although the user is prompted to perform the initialization process in the above-described embodiments, the PND 1 may automatically perform the initialization process.

In addition, in the above-described embodiments, the display is presented in the heading-up mode in the navigation process. The present invention is not limited to this, and the display may instead be presented in a north-up mode or various other modes in the navigation process.

In the above-described embodiments, the three-axis acceleration sensor 4, the Y-axis gyro sensor 5, the Z-axis gyro sensor 6, the atmospheric pressure sensor 7, and the geomagnetic sensor 8 are disposed in the PND 1. However, the present invention is not limited to this, and the three-axis acceleration sensor 4, the Y-axis gyro sensor 5, the Z-axis gyro sensor 6, the atmospheric pressure sensor 7, and the geomagnetic sensor 8 may be disposed outside the PND 1.

In addition, in the above-described embodiments, the PND 1 or the mobile phone apparatus 101 is attached to a vehicle that functions as a movable body. However, the present invention is not limited to this, and the PND 1 and the mobile phone apparatus 101 may also be mounted in other types of movable bodies, such as a ship, a train, and the like.

In addition, in the above-described embodiments, the control unit 11 performs the routine RT2 of the operation control process in accordance with an application program stored in the memory unit 12 in advance.

The present invention is not limited to this, and the control unit 11 may perform the operation control process in accordance with an application program installed from a storage medium, an application program downloaded from the Internet, or an application program installed via various other routes.

In addition, in the above-described embodiments, the PND 1 that serves as a navigation apparatus includes the PND 1 as a main unit, the GPS processing unit 21 as a current-position detection unit, the position calculation unit 25, the navigation unit 26, the geomagnetic sensor 8 as a geomagnetic sensor, the orientation calculation unit 28 as an orientation calculation unit, the cradle detection unit 17 as an attachment-state detector, and the operation control unit 29 as an operation control unit.

The present invention is not limited to this, and the navigation apparatus may include a main unit, a current-position detection unit, a current position calculation unit, a geomagnetic sensor, an orientation calculation unit, a attachment-state detector, and an operation control unit having various other structures.

In addition, in the above-described embodiments, the mobile phone apparatus 101 that serves as a mobile terminal apparatus includes the mobile phone apparatus 101 as a main unit, the GPS processing unit 21 as a current-position detection unit, the position calculation unit 25, the navigation unit 26, the geomagnetic sensor 8 as a geomagnetic sensor, the orientation calculation unit 28 as an orientation calculation unit, the cradle detection unit 17 as an attachment-state detector, the operation control unit 29 as an operation control unit, and the mobile phone unit 110 as a mobile phone unit.

The present invention is not limited to this, and the mobile terminal apparatus may include a main unit, a current-position detection unit, a current position calculation unit, a geomagnetic sensor, an orientation calculation unit, a attachment-state detector, an operation control unit, and a mobile phone unit having various other structures.

The present application contains subject matter related to that disclosed in Japanese Priority Patent Application JP 2009-216082 filed in the Japan Patent Office on Sep. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A navigation apparatus comprising:
a geomagnetic sensor configured to detect a geomagnetic field of the navigation apparatus;
an orientation calculation unit configured to calculate an orientation of the navigation apparatus based on the detected geomagnetic field;
a cradle detection unit configured to detect that the navigation apparatus is connected to a cradle, and to output a signal indicating that the navigation apparatus is connected to the cradle; and
an operation control unit configured to receive the signal output from the cradle detection unit, and to control the orientation calculation unit to not detect the orientation of the navigation apparatus based on the detected geomagnetic field.

2. The navigation apparatus according to claim 1, wherein the operation control unit is configured to control the orientation calculation unit to not detect an orientation of the navigation apparatus by deactivating the geomagnetic sensor.

3. The navigation apparatus according to claim 1, wherein the operation control unit is configured to control the orientation calculation unit to not detect an orientation of the navigation apparatus by deactivating the orientation calculating unit.

4. The navigation apparatus according to claim 1, wherein the operation control unit is configured to control the orientation calculation unit to not detect an orientation of the navigation apparatus by controlling the orientation calculation unit to ignore a signal received from the geomagnetic sensor.

5. The navigation apparatus according to claim 1, further comprising:
an attitude angle detection unit configured to detect an attitude angle indicating an inclination of the navigation apparatus with respect to a ground plane.

6. The navigation apparatus according to claim 5 wherein the orientation calculation unit is configured to calculate an orientation of the navigation apparatus based on the detected attitude angle and the detected geomagnetic field.

7. The navigation apparatus according to claim 6, wherein the operation control unit is configured to control the orientation calculation unit to not detect an orientation of the navigation apparatus by deactivating the attitude angle detection unit.

8. The navigation apparatus according to claim 6, wherein the operation control unit is configured to control the orientation calculation unit to not detect an orientation of the navigation apparatus by deactivating the orientation calculating unit.

9. The navigation apparatus according to claim 6, wherein the operation control unit is configured to control the orientation calculation unit to not detect an orientation of the navigation apparatus by controlling the orientation calculation unit to ignore a signal received from the attitude angle detection unit.

10. The navigation apparatus according to claim 1, wherein the navigation apparatus is a mobile phone.

11. A non-transitory computer-readable medium including computer program instructions, which when executed by a navigation apparatus, cause the navigation apparatus to perform a method comprising:
detecting, at a geomagnetic sensor of the navigation apparatus, a geomagnetic field of the navigation apparatus;
calculating, at an orientation calculation unit of the navigation apparatus, an orientation of the navigation apparatus based on the detected geomagnetic field;
detecting, at a cradle detection unit of the navigation apparatus, that the navigation apparatus is connected to a cradle, and outputting a signal indicating that the navigation apparatus is connected to the cradle; and
receiving, at an operation control unit of the navigation apparatus, the signal output from the cradle detection unit, and controlling the orientation calculation unit to not detect the orientation of the navigation apparatus based on the detected geomagnetic field.

12. The non-transitory computer-readable medium according to claim 11, wherein
the controlling the orientation calculation unit to not detect the orientation of the navigation apparatus includes deactivating the geomagnetic sensor.

13. The non-transitory computer-readable medium according to claim 11, wherein
the controlling the orientation calculation unit to not detect the orientation of the navigation apparatus includes deactivating the orientation calculating unit.

14. The non-transitory computer-readable medium according to claim 11, wherein
the controlling the orientation calculation unit to not detect the orientation of the navigation apparatus includes controlling the orientation calculation unit to ignore a signal received from the geomagnetic sensor.

15. The non-transitory computer-readable medium according to claim 11, wherein the navigation apparatus is a mobile phone.

16. A method performed by a navigation apparatus, the method comprising:
detecting, at a geomagnetic sensor of the navigation apparatus, a geomagnetic field of the navigation apparatus;
calculating, at an orientation calculation unit of the navigation apparatus, an orientation of the navigation apparatus based on the detected geomagnetic field;
detecting, at a cradle detection unit of the navigation apparatus, that the navigation apparatus is connected to a cradle, and outputting a signal indicating that the navigation apparatus is connected to the cradle; and
receiving, at an operation control unit of the navigation apparatus, the signal output from the cradle detection unit, and controlling the orientation calculation unit to not detect the orientation of the navigation apparatus based on the detected geomagnetic field.

17. The method according to claim 16, wherein
the controlling the orientation calculation unit to not detect the orientation of the navigation apparatus includes deactivating the geomagnetic sensor.

18. The method according to claim 16, wherein
the controlling the orientation calculation unit to not detect the orientation of the navigation apparatus includes deactivating the orientation calculating unit.

19. The method according to claim 16, wherein
the controlling the orientation calculation unit to not detect the orientation of the navigation apparatus includes controlling the orientation calculation unit to ignore a signal received from the geomagnetic sensor.

20. The method according to claim 16, wherein the navigation apparatus is a mobile phone.

* * * * *